United States Patent
Park et al.

(10) Patent No.: US 10,133,650 B1
(45) Date of Patent: Nov. 20, 2018

(54) AUTOMATED API PARAMETER RESOLUTION AND VALIDATION

(71) Applicant: FUJITSU LIMITED, Kawasaki-shi, Kanagawa (JP)

(72) Inventors: Junhee Park, San Jose, CA (US); Mehdi Bahrami, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/729,522

(22) Filed: Oct. 10, 2017

(51) Int. Cl.
*G06F 9/44* (2018.01)
*G06F 11/36* (2006.01)

(52) U.S. Cl.
CPC ...... *G06F 11/3608* (2013.01); *G06F 11/3684* (2013.01)

(58) Field of Classification Search
None
See application file for complete search history.

(56) References Cited

U.S. PATENT DOCUMENTS

| | | | | |
|---|---|---|---|---|
| 5,495,571 | A * | 2/1996 | Corrie, Jr. | G06F 11/3684 714/38.1 |
| 8,065,662 | B1 * | 11/2011 | Trounine | G06F 11/3684 713/182 |
| 9,021,443 | B1 * | 4/2015 | Lachwani | G06F 11/3688 717/124 |
| 9,417,992 | B2 | 8/2016 | Huang et al. | |
| 9,552,237 | B2 * | 1/2017 | Biesack | G06F 9/541 |
| 2005/0193266 | A1 * | 9/2005 | Subramanian | G06F 11/3664 714/6.1 |
| 2016/0085662 | A1 * | 3/2016 | Huang | G06F 11/3668 717/124 |
| 2016/0092344 | A1 * | 3/2016 | Bally | H04L 67/16 717/124 |

OTHER PUBLICATIONS

U.S. Appl. No. 15/715,658, filed Sep. 26, 2017.

\* cited by examiner

*Primary Examiner* — Philip Wang
(74) *Attorney, Agent, or Firm* — Maschoff Brennan

(57) ABSTRACT

A method for automated application programming interface (API) validation includes extracting API information from an API repository. The API information is used to generate a test case for the automated API validation. The API information may include a parameter placeholder, parameter information related to a parameter of an API endpoint, an API endpoint of the API, an endpoint description, a description of the API, a description of the parameter, response information, an authentication requirement information, and an API name. The method includes resolving the parameter of the API endpoint. The method includes communicating to a native API system a request using the sample parameter value for the parameter. The method includes comparing a response from the native API system with the response information to validate the API. The method includes verifying integrity of a software application implementing the API endpoint for use with a native software application.

20 Claims, 21 Drawing Sheets

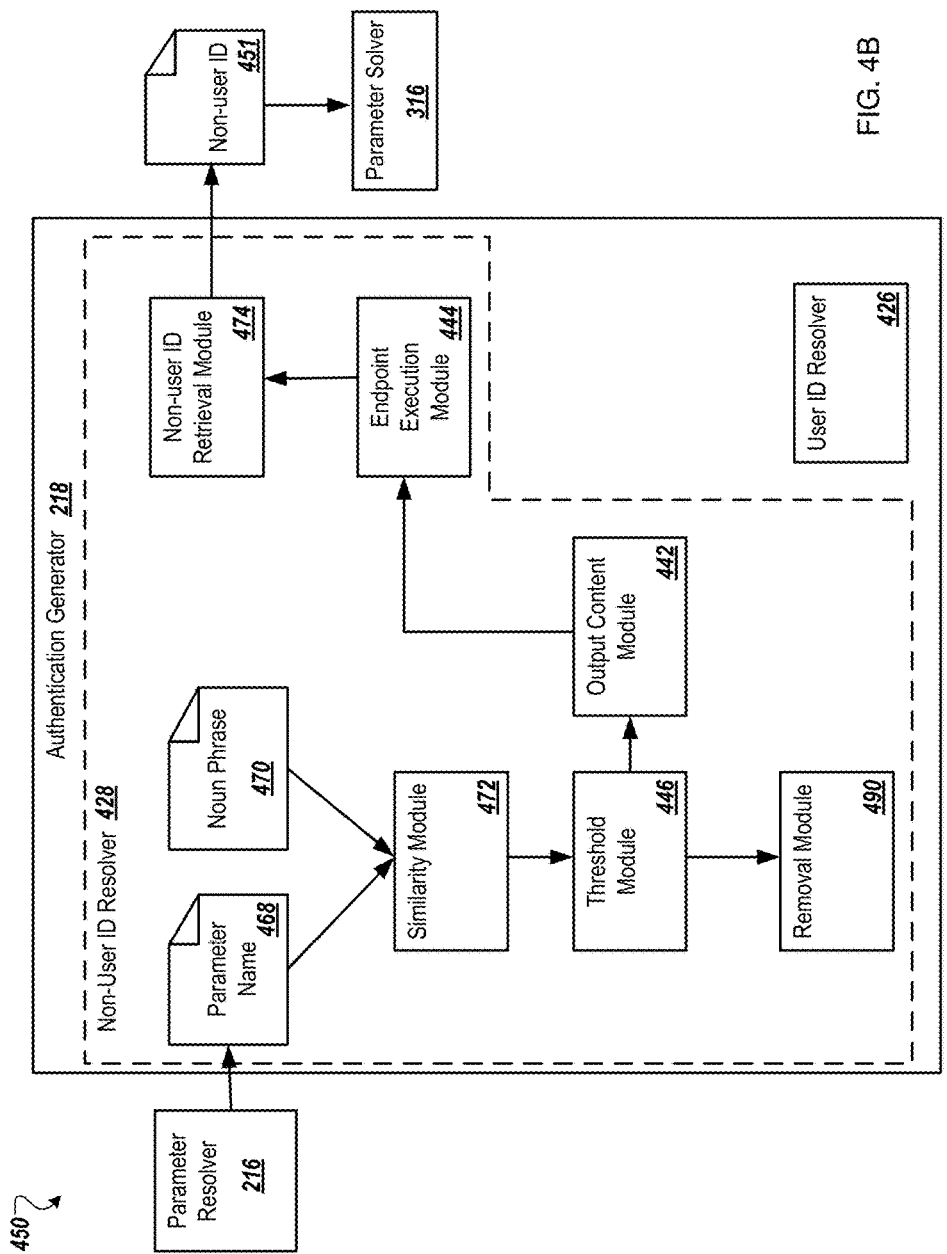

| X | API_Model(X) | Y | API_Model(Y) |
|---|---|---|---|
| Proposali | 0.001 | d | 0.002 |
| Proposal | .762 | id | 0.762 |
| Proposa | 0.0001 | lid | 0.23 |
| Propos | 0.0001 | alid | 0.23 |
| ... | ... | ... | ... |
| P | 0.0001 | roposalid | 0.23 |

FIG. 7

Endpoint: /artists/{id} ⸺ 1002

232 curl -X GET "https://api.spotify.com/v1/albums/4aawyAB9vmqN3uQ7FjRGTy?market=ES" -H "Accept: application/json" -H "Authorization: Bearer BQANtCPWFLYuy4fxI83Lyht_f9jiZrDSV-p2ZeQeQRSEu1rQsoZupAinZ34ehMQRtz21SR5Sg7U-Atwf5cS0aufIo3WeSw_PgeQERZRuQGm_O9Yk2QT4LQmGYnMfMy0uIJsZyzPwLCozNemoEimuk7m5b0qg_wQNf7hTgX5hQMYMxZhYqnrvjajlIZd7VzbxNJ9v6HzwQJikANiVH8ymudyEEYyhBdUAU_Z1VtebZ-cIIxOxCHaFATI5rNJv-K9_wLIS9NXWvZ-VicxxY8kLSXko2iB1vqr4GjJ_P68g0jCAID-bs_djx40YSuUw"

```
HTTP/1.1 200 OK
Access-Control-Allow-Headers: Accept, Authorization, Origin, Content-Type
Access-Control-Max-Age: 604800
X-Content-Type-Options: nosniff
Content-Encoding: gzip
Transfer-Encoding: chunked
Access-Control-Allow-Credentials: true
Strict-Transport-Security: max-age=31536000;
Keep-Alive: timeout=600
Server: nginx
Connection: keep-alive
Cache-Control: public, max-age=7200
Date: Mon, 11 Sep 2017 22:42:56 GMT
Access-Control-Allow-Origin: *
Access-Control-Allow-Methods: GET, POST, OPTIONS, PUT, DELETE
Content-Type: application/json; charset=utf-8
```

```
{
  "album_type" : "album",
  "artists" : [ {
    "external_urls" : {
      "spotify" : "https://open.spotify.com/artist/0TnOYISbd1XYRBk9myaseg"
    },
    "href" : "https://api.spotify.com/v1/artists/0TnOYISbd1XYRBk9myaseg",
    "id" : "0TnOYISbd1XYRBk9myaseg",
    "name" : "Pitbull",
    "type" : "artist",
    "uri" : "spotify:artist:0TnOYISbd1XYRBk9myaseg"
  } ],
```

AUTOMATED API PARAMETER RESOLUTION AND VALIDATION

FIELD

The embodiments discussed herein are related to automated application programming interface (API) parameter resolution and validation.

BACKGROUND

Software applications may be built using one or more application programming interfaces (API or APIs), each of which is a set of routines, protocols, and tools. API documentation specifies how other software components interact with the API based on its definition. APIs may also be used to show the results in a graphical user interface (GUI) components. An API may expose at least some functions and/or data of a software application that enables other applications to use resources of the API without concern for implementation of the functions or data.

The subject matter claimed herein is not limited to embodiments that solve any disadvantages or that operate only in environments, such as those described. Rather, this background is only provided to illustrate one example technology area where some embodiments described herein may be practiced.

SUMMARY

According to an aspect of an embodiment, a method for application programming interface (API) validation using machine-generated parameter resolution and machine-implemented API endpoint validation. The method may include extracting API information from an API repository. The API information may include a parameter placeholder, parameter information related to a parameter of an API endpoint, an endpoint of the API, an endpoint description, a description of the API, a description of the parameter, response information, an authentication requirement information, and an API name. The method may include resolving the parameter of the API endpoint. Resolution of the parameter may include extracting the API name, the endpoint, the API description, and the parameter description. Resolution of the parameter may include retrieving a parameter name and a parameter placeholder from the endpoint. Resolution of the parameter may include generating a noun phrase list of noun phrases which is parsed from the endpoint description based on a syntactic analysis. Resolution of the parameter may include extracting a keyword from the parameter name and the noun phrase list. Resolution of the parameter may include classifying data type and domain of the parameter based at least partially on a query of the keyword in a third-party data repository. Resolution of the parameter may include parsing a label from a query result as a sample parameter value for the parameter in the API. The method may include communicating, to a native API system, a request using the sample parameter value for the parameter for the API. The method may include comparing a response from the native API system with the response information to validate the API. Based on the validity of the API endpoint, the method may include verifying integrity of a software application implementing the API endpoint for use with a native software application on the native API system.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4B illustrates an example non-user ID extraction process that may be implemented in the operating environment of FIG. 1;

FIG. 7 illustrates an example API parameter process that may be implemented in the operating environment of FIG. 1;

FIG. 10 illustrates an example request that may be communicated in the operating environment of FIG. 1;

FIG. 11 illustrates an example response header that may be communicated in the operating environment of FIG. 1;

FIG. 12 illustrates an example response snippet that may be communicated in the operating environment of FIG. 1;

DESCRIPTION OF EMBODIMENTS

Embodiments described in the present disclosure relate to machine-generated application programming interface (API) parameter resolution and validation of APIs. Additionally, embodiments described in the present disclosure relate to computing systems configured for API parameter resolution and automated, machine-implemented API validation. The embodiments described in the current disclosure provide a technical solution to the current inability of computing systems to generate the sample parameter values especially regarding security-type parameters and the current inability use of the sample parameter values in automated machine-implemented validation.

In particular, some embodiments perform an automated, machine-generated parameter resolution, which may be implemented to generate or to extract sample parameter values for API parameters. The embodiments generate sample parameter values for both authentication parameters and other parameters. The sample parameter values are used to validate the API during an automated validation process. Validation of the API may include ensuring, through a series of requests and responses with a native API system, that the API is current and functions correctly. For example, the responses include information requested and expected in the requests. Additionally, generation of such sample parameter values solves a larger technical problem of ensuring APIs are valid following an update or a revision to the APIs.

These and other embodiments are described with reference to the appended Figures in which like item number indicates like function and structure unless described otherwise.

Figure 1:
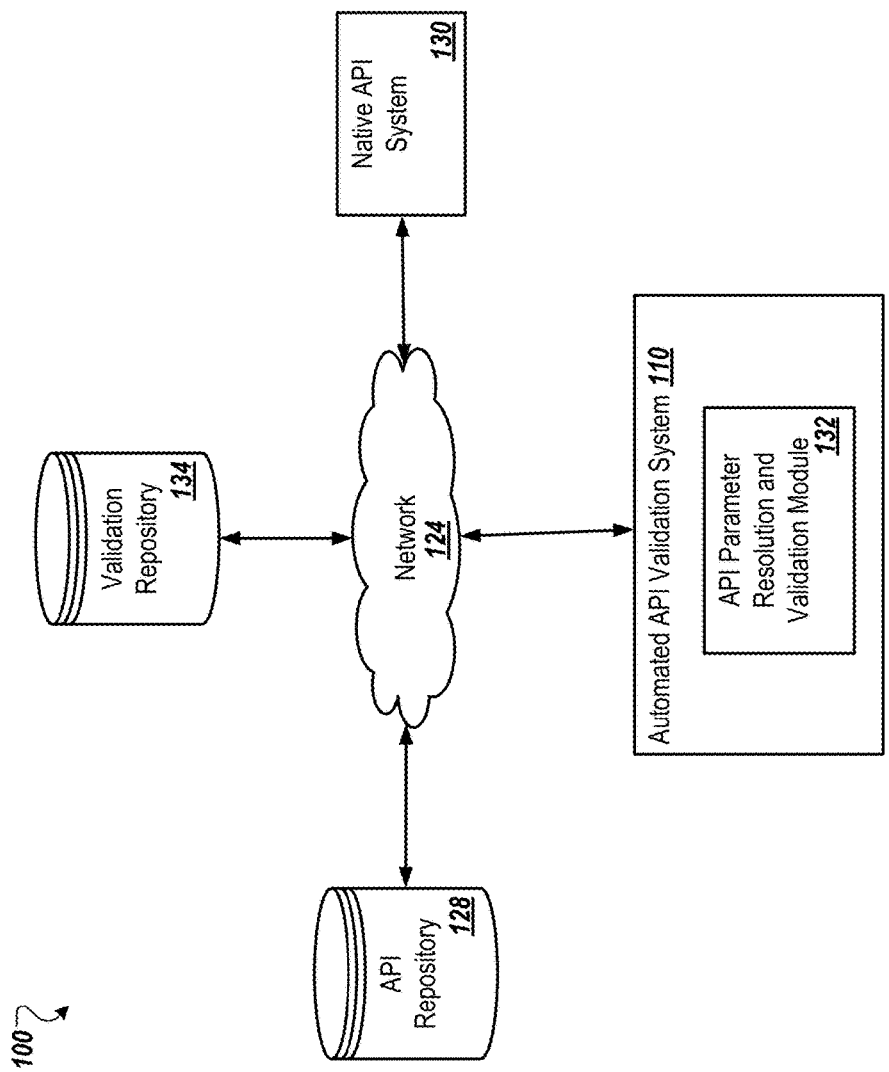
FIG. 1 illustrates a block diagram of an example operating environment of an application programming interface (API) validation system.

FIG. 1 illustrates a block diagram of an example operating environment 100 arranged in accordance with at least one embodiment described herein. The operating environment 100 may include an automated API validation system 110 that is configured to implement machine-generated API parameter resolution and API validation. The machine-generated API parameter resolution enables automated resolution of parameters of one or more APIs, which generates sample parameter values for the parameters of the APIs. The machine-implemented API validation further enables automated validation of the APIs using the sample parameter values for resolved parameters. The validation ensures that the APIs are current, functional, and return correct information.

In some other API validation systems, parameters may be resolved manually. Manual parameter resolution is labor intensive and error prone. Computer systems implemented in these other API validation system are unable to determine a proper or accurate sample parameter values for parameters of an API. Embodiments described in the present disclosure describe a technique not previously performable by computing systems in which parameters are resolved through machine-implemented operations. The machine-implemented operations reduce labor expended in the process of parameter resolution and reduce the errors introduced through the automated implementation of these operations. Additionally, the embodiments described herein may enable API validation more frequently and on an ongoing or semi-ongoing basis.

A benefit of the automated API validation may include efficient and reliable building of software applications, verification of API endpoints used in a software application prior to use or deployment, updating of software applications that employ at least one API, or some combination thereof. For example, some software applications may interact with native software applications and databases on a native API system by employing at least one API. Validation of the APIs may verify that the software application properly interfaces with the native software application or may help ensure that a currently used software applications are properly operating. Moreover, failure to validate APIs or API endpoints may indicate a problem with the software application and/or the native software application or may indicate why the native software application is not properly working. Accordingly, the validation of the APIs described herein may be used to verify, develop, or modify the process of using APIs with the native software applications.

Moreover, the machine-generated API parameter resolution and validation addresses a technical problem existing in computers and computer-related technical fields. For instance, APIs are ubiquitous in information technology (IT) systems. The API endpoints included in these IT systems change as IT systems adapt to new processes. Accordingly, APIs may become stale, non-usable, or return inaccurate information. The API validation system 110 addresses this technical problem by enabling machine-generated parameter resolution, which in turn may result in machine-generated sample parameter values and automated validation using the sample parameter values.

Some embodiments described in the present disclosure are related to an Internet-centric technological field. For example, the embodiments described herein relate to information extraction from computing systems using APIs. The computing systems may, in some embodiments, be communicatively connected via a computing network, such as a network 124 described below.

The operating environment 100 of FIG. 1 may include the automated API validation system 110, the native API system 130, a validation repository 134, and an API repository 128. The API validation system 110, the native API system 130, the validation repository 134, the API repository 128, or some combination thereof may communicate information and data via the network 124. Each of the network 124, API validation system 110, the native API system 130, the validation repository 134, and the API repository 128 are briefly described below.

The network 124 may include any communication network configured for communication of signals between any of the components (e.g., 128, 130, 132, and 134) of the operating environment 100. The network 124 may be wired or wireless. The network 124 may have numerous configurations including a star configuration, a token ring configuration, or another suitable configuration. Furthermore, the network 124 may include a local area network (LAN), a wide area network (WAN) (e.g., the Internet), and/or other interconnected data paths across which multiple devices may communicate. In some embodiments, the network 124 may include a peer-to-peer network. The network 124 may also be coupled to or include portions of a telecommunications network that may enable communication of data in a variety of different communication protocols.

In some embodiments, the network 124 includes or is configured to include a BLUETOOTH® communication network, a Z-Wave® communication network, an Insteon® communication network, an EnOcean® communication network, a Wi-Fi communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communication network, any similar communication networks, or any combination thereof for sending and receiving data. The data communicated in the network 124 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the API validation system 110, the native API system 130, the validation repository 134, and the API repository 128.

The API repository 128 and the validation repository 134 may include any memory or data storage, which may be similar to memory 512 elsewhere in the present disclosure. The API repository 128 and the validation repository 134 may include network communication capabilities such that other components in the operating environment 100 may communicate with the API repository 128 and the validation repository 134.

The API repository 128 and the validation repository 134 may be configured to store various data. For example, the API repository 128 may store machine-readable API specifications. The machine-readable API specifications may be generated based on an API learning process. For example, the machine-readable API specifications may be generated using processes as described in U.S. application Ser. No. 15/156,658 filed Sep. 26, 2017 and/or Ser. No. 15/374,798 filed Dec. 9, 2016, which are incorporated herein by reference in their entireties.

The automated API validation system 110 may be configured to access or receive the machine-readable API specifications from the API repository 128. The machine-readable API specifications may include API information, which may be used to resolve parameters and validate the APIs. For example, the API information may be used to generate a test case or a text case validation record for the automated API validation.

The validation repository 134 may be configured to receive and store validation responses generated during an API validation process. Storage of the validation responses may enable visualization, analysis, and feedback generation. For instance, a history of API or API endpoint changes and associated validation responses may be visible.

The native API system 130 may include any computer-based or hardware-based computing system. The native API system 130 may be configured to communicate with the components of the operating environment 100. The native API system 130 may include a system or device with which a particular API is configured to interact. For example, the particular API may be configured to extract specific information from the native API system 130. The particular API may correspond to one of the generated machine-readable API specification in the API repository 128. The API validation system 110 may be configured to validate the particular API through communication of requests to the native API system 130 and receipt of responses from the native API system 130. Based on a response from the native API system 130, the API validation system 110 may confirm whether the particular API is valid. The communication of requests to the native API system 130 may include an API call that is automatically generated and communicated to the native API system 130.

The API validation system 110 may be configured to implement machine-generated API parameter resolution and validation processes in the operating environment 100. The API validation system 110 may include an API parameter resolution and validation module 132 (hereinafter, "API validation module 132").

The API validation module 132 and one or more components or modules thereof described throughout the present disclosure may be implemented using hardware including a processor, a microprocessor (e.g., to perform or control performance of one or more operations), a field-programmable gate array (FPGA), or an application-specific integrated circuit (ASIC). In some other instances, the API validation module 132 may be implemented using a combination of hardware and software. Implementation in software may include rapid activation and deactivation of one or more transistors or transistor elements such as may be included in hardware of a computing system (e.g., the API validation system 110). Additionally, software defined instructions may operate on information within transistor elements. Implementation of software instructions may at least temporarily reconfigure electronic pathways and transform computing hardware.

The API validation module 132 may be configured to validate an API. For example, in some embodiments, the API validation module 132 may be configured to extract API information from the API repository 128. The API information may include a parameter placeholder, parameter information related to a parameter of the API, an endpoint of the API, an endpoint description, a description of the API, a description of the parameter, response information, an authentication requirement information, an API name, some combinations thereof or other API information. The API information may be used to generate a test case or a text case validation record for the automated API validation.

The API validation module 132 may resolve the parameters of the endpoints of the API. In some embodiments, resolution of the parameters may include retrieval of a parameter name and a parameter placeholder from the endpoint. The resolution may also include generation of a noun phrase list of noun phrases parsed from the endpoint description and the parameter description based on a syntactic analysis. The resolution of the parameters may include extraction of a keyword from the parameter name and the noun phrase list and classification of data type and domain of the parameters based at least partially on a query of the keyword in a third-party data repository (e.g., third-party data repository 317, described below).

The resolution of the one or more parameters may include parsing a label from a query result and the parameters to retrieve a sample parameter value for the parameters in the API. Based on the sample parameter values, the API validation module 132 may generate a validation plan. The validation plan may include validation test cases that include the sample parameter values identified via the parameter resolution processes described herein. The API validation module 132 may communicate a request using the sample parameter values for the parameters and the endpoints for the API to the native API system 130. The API validation module 132 may receive a response from the native API system 130 and compare the response with the response information to validate the API. The API validation module 132 may store the response or information derived therefrom in the validation repository 134.

Modifications, additions, or omissions may be made to the operating environment 100 without departing from the scope of the present disclosure. For example, the operating environment 100 may include one or more API repositories 128, one or more native API systems 130, one or more validation repositories 134, one or more API validation systems 110, or any combination thereof. Moreover, the separation of various components and servers in the embodiments described herein is not meant to indicate that the separation occurs in all embodiments. For example, the API repository 128 and/or the validation repository 134 may be integrated with the API validation system 110. Moreover, it may be understood with the benefit of this disclosure that the described components and servers may generally be integrated together in a single component or server or separated into multiple components or servers.

Figure 2:
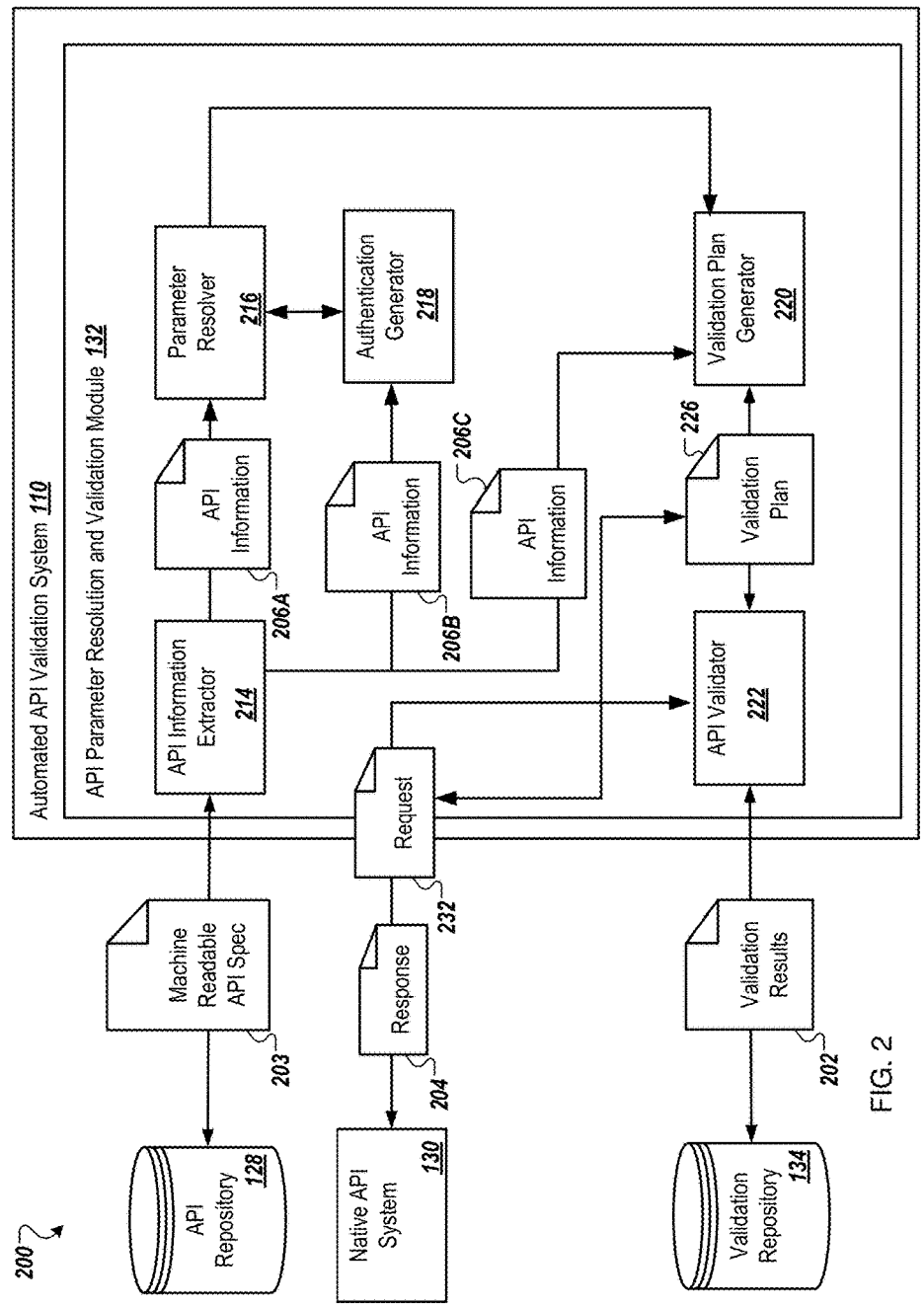
FIG. 2 illustrates an example validation process that may be implemented in the operating environment of FIG. 1.

FIG. 2 illustrates an example validation process 200 that may be implemented in the operating environment 100 of FIG. 1. The validation process 200 may be implemented by the API validation module 132. The validation process 200 may be implemented to determine whether an API currently operates and returns an expected result. In FIG. 2, the API validation system 110 is depicted with the API repository 128, the native API system 130, and the validation repository 134. Although not depicted in FIG. 2, communication of information may be via a network such as the network 124.

In general, the validation process 200 may include the API validation module 132 receiving a machine-readable API specification 203 from the API repository 128. API information 206A-206C (generally, API information 206) is extracted from the machine-readable API specification 203. The API information 206 may be processed by the API validation module 132 and used to generate a validation plan 226.

The validation plan 226 may include validation test cases that include the sample parameter values identified via the parameter resolution processes described herein. The validation plan 226 is used to generate request 232 and receive responses 204. The request 232 may be communicated with the native API system 130 (e.g., using an API call). The responses 204 may be communicated to the API validation 222. Validation results 202 indicative of whether the API is valid may be communicated from the API validation system 110 to the validation repository 134.

The API validation module 132 may include an API information extractor 214, a parameter resolver 216, an authentication generator 218, a validation plan generator 220, and an API validator 222.

The API information extractor 214 may be configured to access the machine-readable API specification 203 from the API repository 128. The API information extractor 214 may extract the API information 206 from the machine-readable API specification 203. For example, the API information 206 may include a parameter placeholder, parameter information related to a parameter of an API, an endpoint of the API, an endpoint description, a description of the API, a description of the parameter, response information, authentication requirement information, an API name, or some combination thereof.

Figure 6:
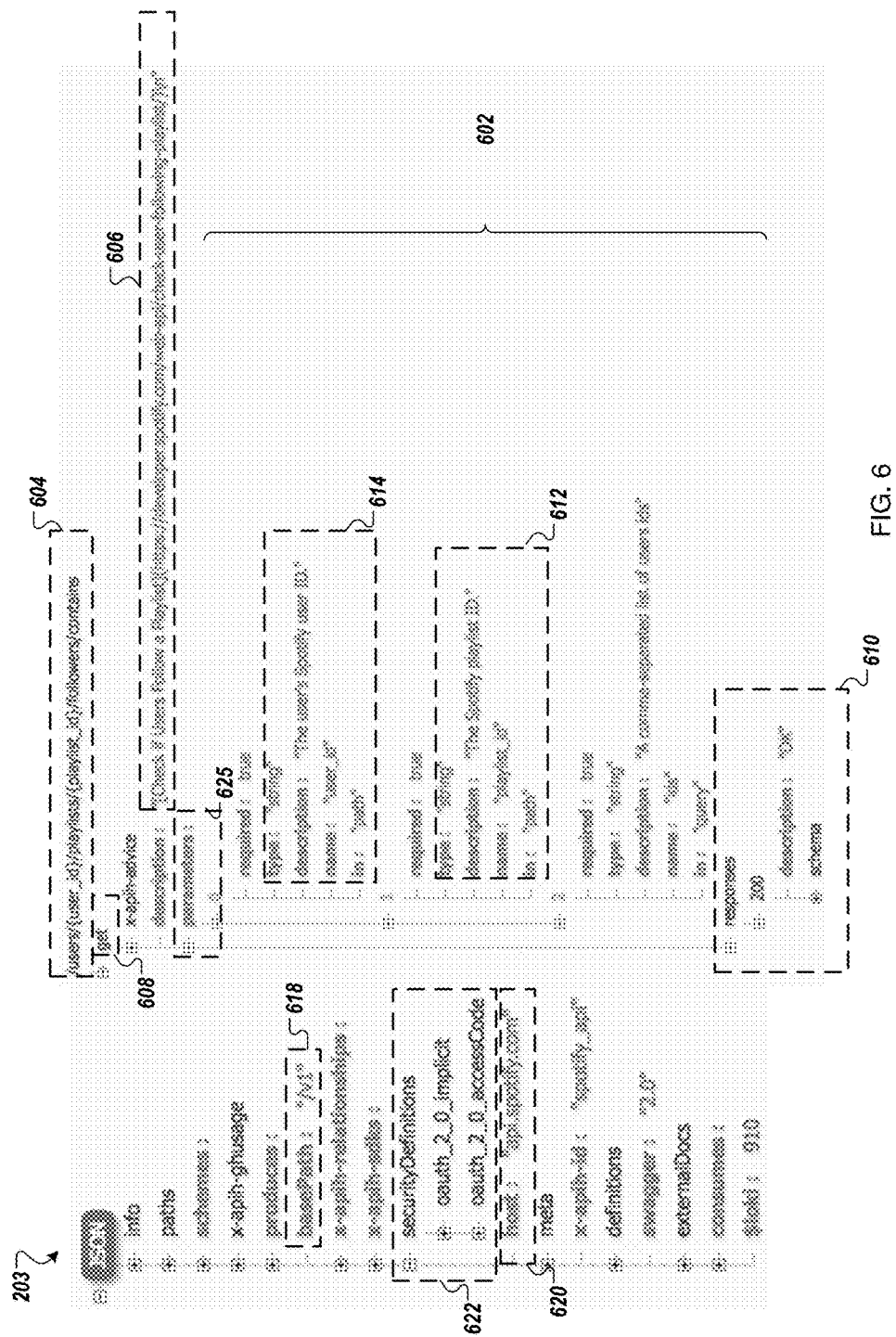
FIG. 6 illustrates an example machine readable API specification that may be implemented in the operating environment of FIG. 1.

An example machine-readable API specification 203 is depicted in FIG. 6. Referring to FIG. 6, the machine-readable API specification 203 includes a JSON file. In other embodiments, the API specification 203 may include a text file, a database record, an XML file, or another suitable file that includes API information. The machine-readable API specification 203 may include API information that may include an endpoint 604, a base-path 618, an authentication requirement 622, a host 620, an http method 608, an API endpoint description 606, parameters 625, parameter descriptions 612 and 614, parameter information 602, and response information 610. Some or all of the API information may be extracted.

Referring back to FIG. 2, the API information extractor 214 may communicate the API information 206 to the parameter resolver 216, the authentication generator 218, and the validation plan generator 220. Each of the API information 206A, 206B, and 206C may be different or may not necessarily include the same portions of the API information 206.

The parameter resolver 216 may be configured to resolve parameters of endpoints of one or more APIs. The parameter resolver 216 may be configured to generate sample parameter values, which may be used by the API validator 222 to validate the API. Some additional details of the parameter resolver 216 are provided with reference to FIG. 3.

The authentication generator 218 may be configured to resolve parameters of the endpoints of one or more APIs. The authentication generator 218 may be configured to generate sample parameter values for the parameters that are ID-related. For example, the authentication generator 218 may be configured to generate sample parameter values for user IDs, non-user IDs, access tokens, etc. Some additional details of the authentication generator 218 are provided with reference to FIGS. 4A and 4B.

The validation plan generator 220 may be configured to generate a validation plan 226. For example, the validation plan generator 220 may be configured to aggregate information from the API information extractor 214, the parameter resolver 216, the authentication generator 218, or some combination thereof. Based on an aggregation, the validation plan generator 220 may create a list of fully resolved list of endpoints to be validated by the API validator 222.

Figure 9:
FIG. 9 illustrates an example validation plan that may be implemented in the operating environment of FIG. 1.

FIG. 9 illustrates an example of the validation plan 226. The validation plan 226 includes endpoints 902 and 904 or an API. The endpoints 902 and 904 may be fully resolved, which may indicate that each parameter of the endpoints 902 and 904 have a sample parameter value generated by the parameter resolver 216 and the authentication generator 218. Additionally, the validation plan 226 may include a location 910 of a native API system (e.g., 130 of FIGS. 1 and 2). The validation plan 226 may also include a request 912 and 914 and authorizations 906 and 908. In other embodiments, the validation plan 226 may have more than two endpoints and there may be other information related to one or more of the endpoints. For instance, some endpoints may not include authorizations and/or may include another command (e.g., HEAD, POST, PUT, PUSH, DELETE, COPY, etc.).

Referring back to FIG. 2, the validation plan 226 may be communicated to the API validator 222. The API validator 222 may be configured to communicate the request 232 to the native API system 130 based on the validation plan 226. The request 232 may be communicated using the sample parameter value for the parameter and the endpoint for the API. FIG. 10 depicts an example of the request 232. The request 232 may include a cURL request 1004 for an endpoint 1002. The request 232 of FIG. 10 may be used to validate the endpoint 904 of FIG. 9. In some embodiments, the request 232 may be formatted according to another protocol.

Referring back to FIG. 2. The native API system 130 may communicate the responses 204 to the API validator 222.

The API validator 222 may be configured to analyze the responses 204 to determine whether the API is valid. For instance, the API validator 222 may compare the responses 204 with some portion of the API information 206 such as the response information (e.g. 610). If the response conforms or substantially conforms to the response information, then the parameter may be validated for the API. For instance, FIG. 11 depicts an example response header 1100 that may be included in the responses 204. The response header 1100 may indicate an acceptance of the request 232. FIG. 12 depicts an example response snippet 1200. The response snippet 1200 includes information requested in the request 232. The API validator 222 may generate the validation results 202 and communicate the validation results 202 to the validation repository. The validation results 202 may be reviewed, accessed, analyzed, etc.

Figure 3:
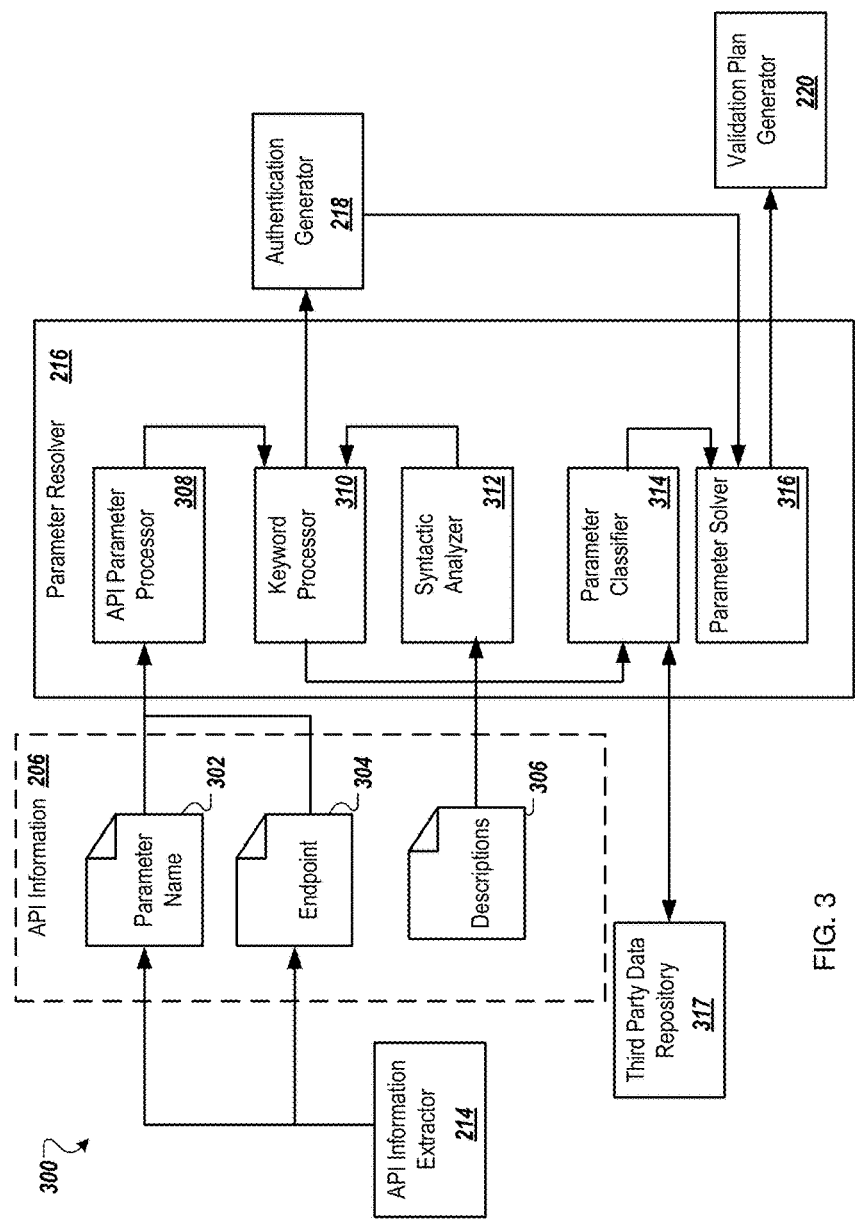
FIG. 3 illustrates an example machine-generated parameter resolution process that may be implemented in the operating environment of FIG. 1.

FIG. 3 illustrates an example parameter resolution process 300 that may be implemented in the operating environment 100 of FIG. 1. The parameter resolver 216 may be configured to implement the parameter resolution process 300. The parameter resolution process 300 may include automated and machine-generated operations to generate and extract sample parameter values for parameters of APIs that may be used in validation of the API. For example, the parameters may include {State} and {postal}. The sample parameter values may include 'New York' and '94085.'

The parameter resolver 216 may be configured to receive API information 206 or some portion thereof from the API information extractor 214. The parameter resolver 216 may then generate or extract sample parameter values for the parameters. The parameter resolver 216 may communicate the sample parameter values to the validation plan generator 220 described above.

In the embodiment depicted in FIG. 3, the parameter resolver 216 may include an API parameter processor 308, a keyword processor 310, a syntactic analyzer 312, a parameter classifier 314, and a parameter solver 316. The API parameter processor 308 may be configured to receive at least a part of the API information 206. For instance, in the depicted embodiment, the API parameter processor 308 may be configured to receive a parameter name 302 and an endpoint 304. As mentioned above, the API information extractor 214 may communicate the parameter name 302 and the endpoint 304 to the API parameter processor 308. Examples of the endpoint 304 may include:
    /users/{user_id}/playlists/{playlist_id}; and/or
    /proposals/{proposalid}/{revisionNumber}/{updateAction}.

In the endpoint 304, the term between the curly braces { } may include a parameter placeholder. The API parameter processor 308 may be configured to output human-readable parameter words. For example, the API parameter processor 308 may be configured to output "user_id," "playlist id," "proposal id," "revision Number," and "update Action" from the endpoints 304 above.

The API parameter processor 308 may be configured to determine the human-readable parameter words by retrieving parameter placeholders (e.g., terms in the '{ }') from endpoints 304. The API parameter processor 308 may remove special characters from the retrieved parameter placeholders. The special characters, which may be removed, may include _, -, #, etc.

The API parameter processor 308 may compare the parameter names 302 with the retrieved parameter placeholders. In response to the parameter name 302 being the same as the retrieved parameter placeholder, the retrieved parameter placeholder or the parameter name 302 may be added as a parameter word. In response to the parameter name 302 being different from the retrieved parameter placeholder, the retrieved parameter placeholder and the parameter name 302 may be added as the parameter words.

The API parameter processor 308 may capture two or more words in the parameter word(s). The captured words may be captured using an API language model and a space may be added between the captured words. An example of the API language model may include:

model=languageModel(API_Documentations,min_count=1,size=1)

In the example above, LaguageModel is used, which is a word embedding processes.

For example, FIG. 7 depicts a table 700 used to capture the words and add the space between the words. In particular, in the table 700 the parameter word "proposalid" is being analyzed based on the API language model. A pointer may state at the right of the parameter word and then move one character at a time left. With each positioning of the pointer, two words are captured, which are labeled with an X and a Y in a first column 702 and a third column 706. Using the API language model a value is assigned to each of the words. The value is indicative of a commonality of use of the word in the API language model. The higher the value, the more likely the word is used in the API language model. The value of the word in X is provided in a second column 704 and the value of the word in Y is provided in the fourth column 708. In each of the rows 710, 712, 714, 716, and 718 the pointer is in a different position, which creates different words and values assigned to the words. The words with the largest values may be selected for the captured words. The captured words are output as the human-readable parameter words from the API parameter processor 308.

The syntactic analyzer 312 may be configured to receive descriptions 306. The descriptions 306 may include parameter descriptions and endpoint descriptions. The syntactic analyzer 312 may be configured to output a noun phrase list for the parameter descriptions and the endpoint descriptions. For instance, in some embodiments, the syntactic analyzer 312 may be configured to output a noun phrase list for each of the descriptions 306.

The syntactic analyzer 312 may be configured to parse each noun phrase from each sentence or clause of the descriptions 306. For example, the descriptions 306 may include sentences:
    "The name of the user account to update" and
    "The title of the program for which you seek series-related information".
The syntactic analyzer 312 may parse the noun phrases "the name" and "the user account" from the first sentence and "the title," "the program," "you," and "series-related information" from the second sentence. The parsed noun phrases may be included in a noun phrase list, which may be communicated to the keyword processor 310 and/or other modules/components of the API resolution module 132.

The keyword processor 310 may be configured to receive outputs (e.g., parameter names and noun phrase lists) from the API parameter processor 308 and the syntactic analyzer 312. The keyword processor 310 may be configured to extract keywords for the parameter classifier 314 and/or for the authentication generator 218 from the received outputs.

For example, in some embodiments, the keyword processor 310 may be configured to compute a similarity score that is representative or indicative of a cosine similarity between the parameter name and at least one of the noun phrases of the noun phrase list. In response to the similarity score being greater than a particular threshold, the noun phrase and/or the parameter name (which may be identical or substantially similar) may be output to the parameter classifier 314.

For example, an example parameter name may include "state," which may be output from the API parameter processor 308. An example noun phrase output from the syntactic analyzer 312 may include "the state," "the place," and "weather information." The similarity score between "state" and "the state" may exceed the particular threshold. Accordingly, the keyword processor 310 may output a keyword "state" to the parameter classifier 314.

The particular threshold (and other particular thresholds described in the present disclosure) may be about 0.5, 0.6, 0.7, 0.8, or another suitable particular threshold. In some embodiments, the particular threshold may change as a process continues. For example, the process may be initially set to 0.5. Following one or more iterations, the particular threshold may increase or decrease to alter accuracy and/or effectiveness of operations of the parameter classifier 314 or of another portion or component described in the present disclosure.

Additionally, in some embodiments, the keyword processor 310 may determine whether the parameter name is ID-related or an ID-related word. For example, the keyword processor 310 may determine that a parameter name such as user ID, artist ID, playlist ID, project ID, are ID-related words. In response to a determination that the parameter name is ID-related, the keyword processor 310 may be configured to communicate the parameter name to the authentication generator 218, which is described elsewhere in the present disclosure.

The parameter classifier 314 may be configured to find a class of data type and domain of a parameter. An example of the domain, as related to the parameter classifier 314, includes a category or class of the parameter. For instance, the term "state" may include several meanings such as a state in the United States of America, a nation in the world, or configurations of matter (e.g., gas, liquid, solid). The parameter classifier 314 is configured to determine whether the "state" being analyzed is related to one of the states in the USA, a nation, or a state of matter.

The parameter classifier 314 may receive as input the keywords output from the keyword processor 310 and/or the noun phrase lists from the syntactic analyzer 312. The parameter classifier 314 may compute a word vector between the keyword and the noun phrases. The parameter classifier 314 may generate a query of the keyword in a third-party data repository 317. For example, the query may be generated for a digital encyclopedia such as DBpedia or another suitable third-party data repository. An example of the query generated by the parameter classifier 314 for the keyword "state" may include:

http://lookup.dbpedia.org/api/search.asmx/Keyword-Search? . . . . QueryClass=& QueryString=state.

The query may be communicated to the third-party data repository 317. The third-party data repository 317 may return results. The results may take the form of an array with two or more results, each having one or more classes, labels, and categories. The parameter classifier 314 may generate a word vector of the classes and the categories in the results. The parameter classifier 314 may perform a similarity evaluation such as a cosine similarity between the word vectors (e.g., the word vector generated for the classes and categories and the word vector of keyword and noun phrases). The parameter classifier 314 may detect the query result with a highest match and communicate the query result to the parameter solver 316.

Figure 8:
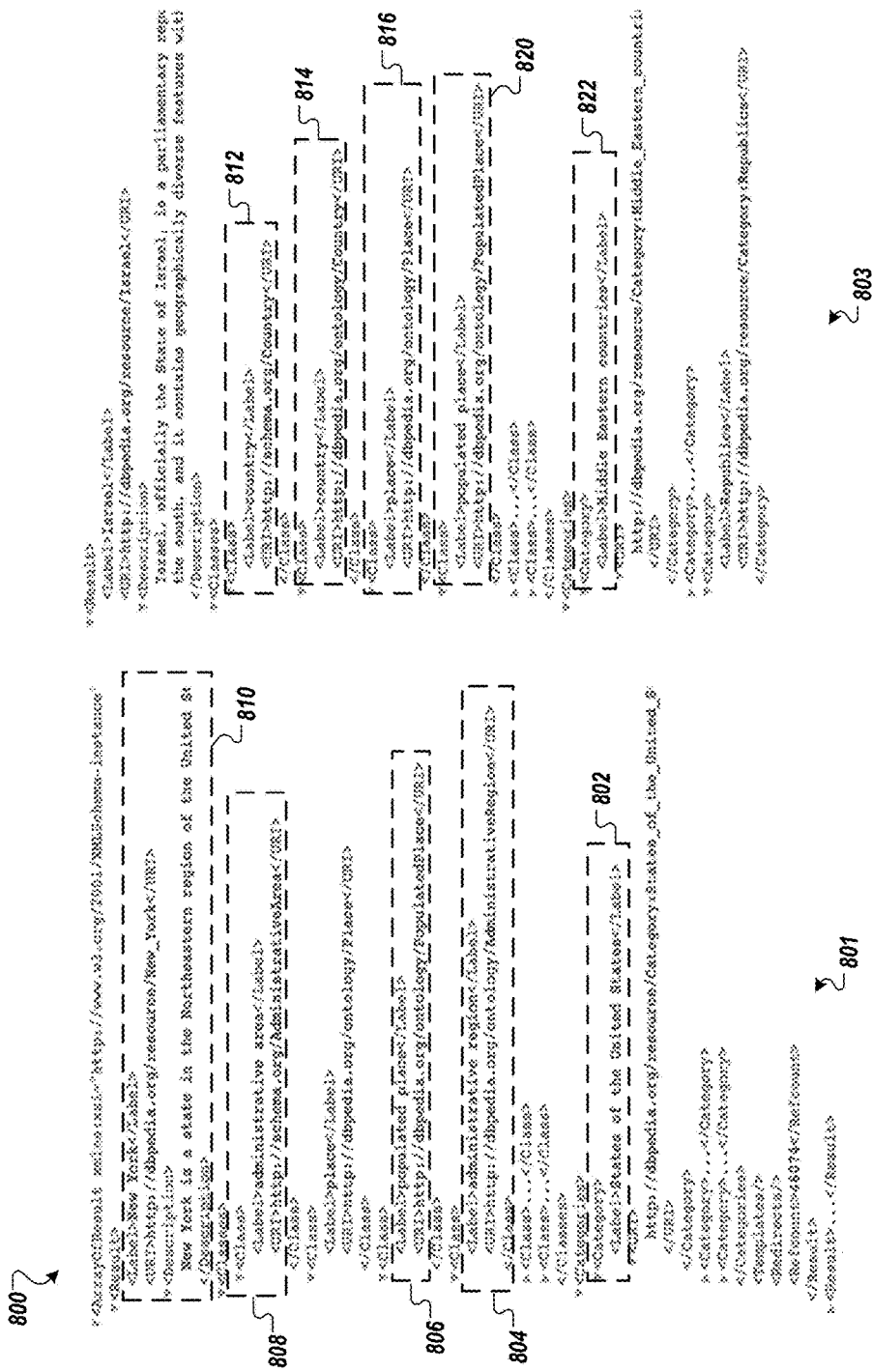
FIG. 8 illustrates an example keyword search query result array that may be implemented in the operating environment of FIG. 1.

FIG. 8 illustrates an example keyword search query result array (result array) 800 that may be implemented in the operating environment 100 of FIG. 1. The result array 800 includes a first result 801 and a second result 803. The first result 801 includes a first category 802, which is "States of the United States." The second result 803 includes a second category 822, which is "Middle Eastern countries." The first result 801 includes multiple classes 808, 806, and 804. The second result 803 includes multiple classes 812, 814, 816, and 820.

Word vectors may be computed for the classes 808, 806, 804, 812, 814, 816, and 820 and the categories 802 and 822. For example, for the first result 801, a first word vector may be computed for the classes 804, 806, and 808 and the category 802. For the second result 803, a second word vector may be computed for the classes 812, 814, 816, and 820 and the category 822. The parameter classifier 314 may also generate a third word vector for the keyword (here, state) and noun phrases. The parameter classifier 314 may perform a first cosine similarity between the first word vector and the third word vector and a second cosine similarity between the second word vector and the third word vector. In response to the first cosine similarity being greater than the second cosine similarity, the parameter classifier 314 may detect that the first result 801 is the query result with the highest match and forward the first result 801 to the parameter solver 316. For example, the parameter classifier 314 may communicate "http://dbpedia.org/resource/New_York" for "state" parameter to the parameter solver 316.

The parameter solver 316 is configured to receive information from the parameter classifier 314 and the authentication generator 218. For the information received from the parameter classifier 314, the parameter solver 316 may be configured to parse a label from the forwarded query result. Referring to FIG. 8, for instance, the "http://dbpedia.org/resource/New_York" includes a label 810, which may be parsed by the parameter solver 316. The label may be used as the sample parameter value for the parameter. The parameter solver 316 may forward the sample parameter value to the validation plan generator 220 of FIG. 2. For the information received from the authentication generator 218, the parameter solver 316 forwards the sample parameter values of the user ID, the non-user ID, access tokens, etc. to the validation plan generator 220. Some details of the user ID, the non-user ID, and the access tokens are provided elsewhere in the present disclosure.

Additionally, in some embodiments, resolution of the parameter may include crawling a third party website to find a matching endpoint example to extract the sample parameter value for the parameter in the API. In these and other embodiments, the parameter solver 316 may be configured to perform a secondary query to find sample parameter values. For instance, in response to a query result not being found, the parameter solver 316 may perform the secondary search.

The secondary search may be performed on a web search engine. The query items in the search may include a developer page URL (e.g., API document page site from API publisher), third-party site where open source projects are published, a third-party developers forum where Q&A data may be maintained and an endpoint with the host and base-path for the API being validated. Search of the open source projects, the third-party developers forums, etc. may limit a scope of the search. The host and base-path may be extracted from the machine-readable API specification (e.g., 203 of FIGS. 2 and 618 and 620 of FIG. 6). The parameter solver 316 may clean the developer page for a query, which may add portions needed to implement a query. The parameter solver 316 may then clean the endpoint and a regular expression may be found for the cleaned endpoint. Some additional details of the machine learning based API learning which employs regular expression may be found in U.S. application Ser. No. 15/156,658 filed Sep. 26, 2017. The query may be implemented using an automated web browser. The parameter solver 316 may then extract the text from the result page and compare the query items. The term or terms not included in the query items or that replaces wildcards in the query items may be used as the sample parameter value.

For example, a developer page URL may be "https://developer.github.com/v3/preview" The endpoint with the host and the base-path may be "api.github.com/orgs/{org}/repos," in which the host and base-path are "api.github.com." The developer URL may be cleaned for the query, which may result in the developer URL becoming "developer.github.com" The cleaned endpoint may include "/orgs" The regular expression of the cleaned endpoint may be "/orgs/[a-zA-Z0-9_]+/repos." The parameter solver 316 may then execute the query using web browsing automation technologies using "site:developer.github.com" and "/orgs" as keyword items. One of the search results may include the link "https://api.github.com/orgs/mozilla/repos." The parameter solver 316 may then extract the "mozilla" from this result because it replaces the wildcard portion of the regular expression. The parameter solver 316 may use the "mozilla" as a sample parameter value.

Figure 4A:
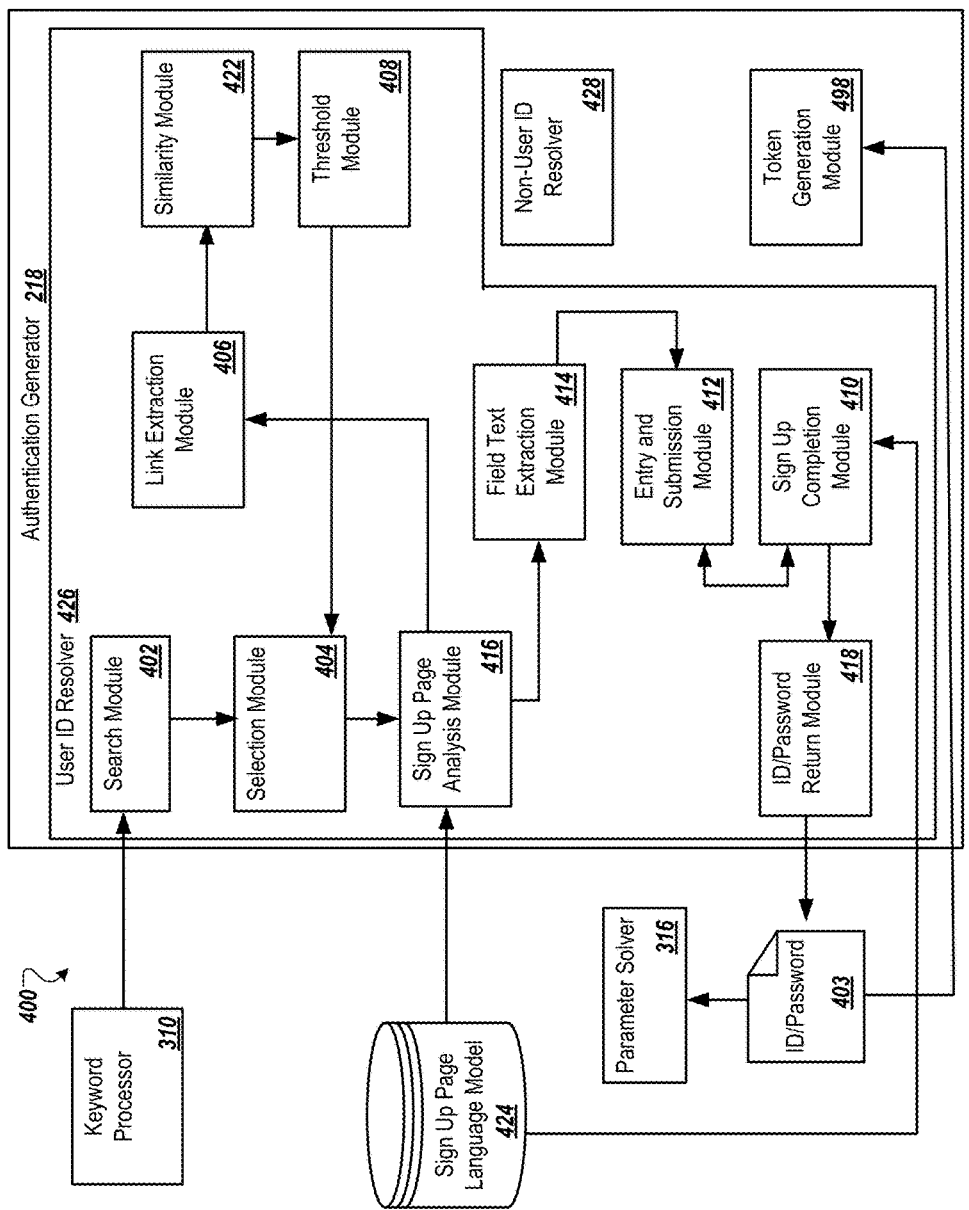
FIG. 4A illustrates an example user identifier (ID) extraction process that may be implemented in the operating environment of FIG. 1.

FIG. 4A illustrates an example user ID extraction process 400 that may be implemented in the operating environment 100 of FIG. 1. The user ID extraction process 400 may be performed by a user ID resolver 426 of the authentication generator 218. The authentication generator 218 may generally implement machine-assisted processes (e.g., 400, 450, etc.) to create and retrieve identifiers. The identifiers may include user IDs and other non-user IDs. Additionally, the authentication generator 218 may create access tokens and automatically refresh the access tokens. The authentication generator 218 may include the user ID resolver 426, the non-user ID resolver 428, and a token generation module 498.

The user ID resolver 426 may implement a web-automation technique combined with automated validation information extracted from the API specification to generate or extract a user ID and/or a password (ID/password) 403. The ID/password 403 may be used as sample parameter values for parameters that are user ID-related or include a user ID-related word.

The example user ID resolver 426 of FIG. 4A may include a search module 402, a selection module 404, a sign up page analysis module 416, a field text extraction module 414, an entry and submission module 412, a sign up completion module 410, an ID/password extraction module 418, a link extraction module 406, a similarity module 422, and a threshold module 408.

The search module 402 may be configured to search a network (e.g., 124 of FIG. 1) using a sign up keyword and an API name. For example, the search module 402 may be configured to search the Internet using a web search engine or search from API documentations. The search module 402 may input the sign up keyword and the API name into the search application and initiate a search. The sign up keyword may be "sign up" or another similar search keyword such as "sign in," "register," and the like. Accordingly, in some embodiments, the search module 402 may be configured to enter into the web search engine "sign up" and "SPOTIFY®" and initiate a search.

The selection module 404 may be configured to select a particular number of search results. The particular number of search results may include three or another suitable number of search results. For instance, the selection module 404 may be configured to select the first or top three search results returned from the search application. The sign up page analysis module 416 may be configured to determine whether each page of the selected results is a sign up page. The sign up page analysis module 416 may use a sign up page language model 424 to determine whether each page is a sign up page. The sign up page language model 424 may have structures, features, fields, and words that commonly appear on sign pages. The sign up page analysis module 416 may perform a page structure/content analysis to determine whether the pages from the selected results include structures, features, fields, etc. of the sign up page language model 424.

In some embodiments, the search module 402 may also be configured to search for sign up pages from a public repository. In these and other embodiments, the sign up page may be returned, thus a search of the network and selection of some portion of the results may be unnecessary.

In response to one of the pages being a sign up page, the field text extraction module 414 may be configured to extract the text in each of the fields in the pages. For example, a SPOTIFY® sign up page (www.spotify.com/us/signup/) includes several fields (e.g., email, confirm email, password, date of birth, etc.). The field text extraction module 414 may extract the text from such fields and determine a value for each of the fields. For instance, the field text extraction module 414 may find a suitable email address to enter into the email field. The entry and submission module 412 may be configured to enter one or more first values into the fields on the page and submit the first values. The sign up completion module 410 may be configured to determine whether the sign-up process is complete. For instance, the sign up completion module 410 may be configured to monitor the response to submission of the first values. In response to the response including a confirmation page or a confirmation email, the sign up completion module 410 may determine that the sign-up process is complete. The ID/password return module 418 may then return the ID/password 403 from the first values and communicate the ID/password 403 to the parameter solver 316. The ID/password 403 may be used as a sample parameter value from parameters of an endpoint of an API during a validation process.

If the sign up completion module 410 determines that the sign up process is not complete, the entry and submission module 412 and/or the field text extraction module 414 may determine second values that may be entered into the fields. The sign up completion module 410 may then determine whether the second values completed the sign-up process. If so, the ID/password 403 are extracted and communicated to the parameter solver 316. This process may continue until the sign-up process is complete or some number of iterations is completed.

Additionally, in response to the sign up page analysis module 416 determining that the page selected from the search is not a sign up page, the link extraction module 406 may extract links (e.g., hyperlinks) from the page. The similarity module 422 may compare the links to a key list. The key list may include sign up, sign in, account, registration, or another suitable key that is indicative of a likely sign up page. The threshold module 408 may communicate each link with a similarity greater than a threshold to the selection module 404. The selection module 404 may then select a particular number of the links. The sign up page analysis module 416 may determine whether the pages of the links are sign up pages. The other modules 414, 412, 410, 418, 406, 422, and 408 may then process the pages to extract the ID/password 403 therefrom or from links in these pages.

About 80% of APIs may require or involve some form of authentication, which may include an access token. The access token may be refreshed periodically. To accommodate for the authentication, the token generation module 498 may be configured to request the access token and/or refresh the access token. In some embodiments, the token generation module 498 may be configured to request authorization to access data. The token generation module 498 may determine whether the user ID and the password (e.g., ID/password 403) have been extracted. For example, the token generation module 498 may determine whether the user ID and the password have been extracted at a log-in prompt page. If not, the token generation module 498 may communicate with the user ID resolver 426 to extract the ID/password 403 as described above. If so, the token generation module 498 may request an access token and refresh token. The access token and the refresh token may be requested using the granted authorization code. After a time in which the access token is expired, the token generation module 498 may request a new access token. The new access token may be requested following a particular period of time after which the access token expires. The new access token may be requested using the refresh token. One type of authentication is OAuth2.0 Access token. The token generation module 498 may be configured to make such requests according to the OAuth2.0 Access Token protocol.

The non-user ID resolver 428 is described with respect to FIG. 4B. FIG. 4B illustrates an example non-user ID extraction process 450 that may be implemented in the operating environment 100 of FIG. 1. The non-user ID extraction process 450 may be performed to resolve or find a sample parameter value for an identification-related parameter that is not a "user ID." As used in the present disclosure, a non-user ID may also be referred to as a non-user ID 451. Some examples of the non-user ID 451 may include an artist ID, a playlist ID, a project ID, or another identifier that may be used in a parameter of an API endpoint.

FIG. 4B depicts the authentication generator 218, which is partially described with reference to FIG. 4A. The authentication generator 218 may include the user ID resolver 426 described with reference to FIG. 4A and the non-user ID resolver 428. In response to a determination that a parameter name is not user ID-related or not a user ID-related word, a parameter resolution process may implement the non-user ID extraction process 450. Alternatively, in response to a determination that the parameter name is user ID-related or a user ID-related word, the user ID extraction process 400 may be executed. In some circumstances, both the non-user ID extraction process 450 and the user ID extraction process 400 may be performed during a parameter resolution process.

The non-user ID resolver 428 may be configured to perform the non-user ID extraction process 450. The non-user ID resolver 428 may include a similarity module 472, a threshold module 446, a removal module 490, an output content module 442, an endpoint execution module 444, and a non-user ID retrieval module 474.

The similarity module 472 may be configured to receive a parameter name 468 and noun phrases 470. The noun phrases 470 may be included in a noun phrase list described above, which may be generated by a syntactic analysis. The noun phrases 470 may be extracted from an endpoint description of a first endpoint of multiple endpoints of an API or API specification. The parameter name 468 may include a name of a parameter, which may be a result from a parameter process performed by an API parameter processor (e.g., 308), or another suitable module.

The similarity module 472 may be configured to compute a similarity score. The similarity score may be may be indicative of a similarity between the parameter name 468 and the noun phrases 470. The similarity module 472 may be configured to communicate the similarity score to the threshold module 446.

The threshold module 446 may be configured to implement a comparison between the similarity score and a particular threshold. The particular threshold may be about 0.5, 0.6, 0.7, 0.8, or another suitable particular threshold. In some embodiments, the particular threshold may change as a process continues. For example, the process may be initially set to 0.5. Following one or more iterations, the particular threshold may increase or decrease to alter accuracy and/or effectiveness of the non-user ID 451.

The threshold module 446 may provide an output to the output content module 442 or to the removal module 490. In response to the similarity score being greater than the particular threshold, the threshold module 446 may communicate the output to the output content module 442. In response to the similarity score being less than the particular threshold, the threshold module 446 may communicate the output to the removal module 490. The output communicated to the output content module 442 may include the parameter name 468 and the noun phrase(s) 470 with the similarity score that exceeds the threshold. The output communicated to the removal module 490 may include the parameter name 468 and the noun phrase(s) 470 with the similarity score that is below the particular threshold.

The removal module 490 may remove the parameter name 468 and/or the noun phrases 470, which may indicate that the parameter name 468 is insufficiently similar to the noun phrases. The lack of similarity may reduce the likelihood that the non-user ID 451 is contained in the parameter name 468 and the noun phrases 470.

The output content module 442 may determine whether the non-user ID 451 is contained in the output received from the threshold module 446. In response to the output including the non-user ID 451, the endpoint execution module 444 may execute the endpoint corresponding to the endpoint and the endpoint description from which the noun phrases 470 are extracted. The non-user ID retrieval module 474 may then retrieve the non-user ID 451 and communicate the non-user ID 451 to the parameter solver 316. In response to the output not including the non-user ID 451, another endpoint of the multiple endpoints and the noun phrases related thereto may be evaluated by the non-user ID resolver 428. The request ID may be used as a sample parameter value of a parameter that includes a non-user ID.

Additionally, in some embodiments, the output content module 442 may include responses returned in response to analysis of other API endpoints. The output content module 442 may determine whether the non-user ID 451 has been returned in the responses to the other API endpoints. For instance, a "ProjectID" may be found in the output content module 442 after an endpoint "Create Project" is executed.

Figure 5:
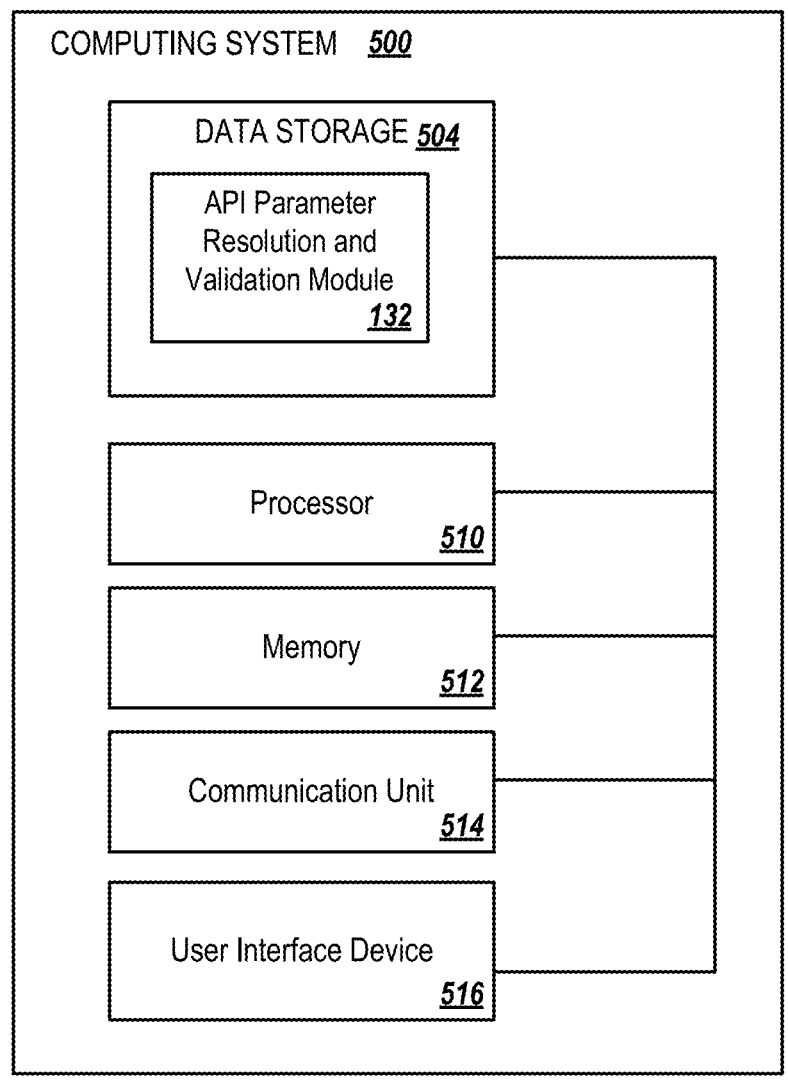
FIG. 5 is a block diagram of an example computing system that is configured for machine-generated parameter resolution and API validation.

FIG. 5 illustrates an example computing system 500 configured for machine-generated parameter resolution and API validation according to at least one embodiment of the present disclosure. The computing system 500 may be implemented in the operating environment 100 of FIG. 1, for instance. Examples of the computing system 500 may include one or both of the API validation system 110 and the native API system 130. The computing system 500 may include one or more processors 510, a memory 512, a communication unit 514, the user interface device 516, and a data storage 504 that includes the API validation module 132.

The processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 5, the processor 510 may more generally include any number of processors configured to perform individually or collectively any number of operations described in the present disclosure. Additionally, one or more of the processors 510 may be present on one or more different electronic devices or computing systems. In some embodiments, the processor 510 may interpret and/or execute program instructions and/or process data stored in the memory 512, the data storage 504, or the memory 512 and the data storage 504. In some embodiments, the processor 510 may fetch program instructions from the data storage 504 and load the program instructions in the memory 512. After the program instructions are loaded into the memory 512, the processor 510 may execute the program instructions.

The memory 512 and the data storage 504 may include computer-readable storage media for carrying or having computer-executable instructions or data structures stored thereon. Such computer-readable storage media may include any available media that may be accessed by a general-purpose or special-purpose computer, such as the processor 510. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 514 may include one or more pieces of hardware configured to receive and send communications. In some embodiments, the communication unit 514 may include one or more of an antenna, a wired port, and modulation/demodulation hardware, among other communication hardware devices. In particular, the communication unit 514 may be configured to receive a communication from outside the computing system 500 and to present the communication to the processor 510 or to send a communication from the processor 510 to another device or network (e.g., 124 of FIG. 1).

The user interface device 516 may include one or more pieces of hardware configured to receive input from and/or provide output to a user. In some embodiments, the user interface device 516 may include one or more of a speaker, a microphone, a display, a keyboard, a touch screen, or a holographic projection, among other hardware devices.

The validation modules 132 may include program instructions stored in the data storage 504. The processor 510 may be configured to load the validation modules 132 into the memory 512 and execute the validation modules 132. Alternatively, the processor 510 may execute the validation modules 132 line-by-line from the data storage 504 without loading them into the memory 512. When executing the validation modules 132, the processor 510 may be configured to perform a participation verification process as described elsewhere in this disclosure.

Modifications, additions, or omissions may be made to the computing system 500 without departing from the scope of the present disclosure. For example, in some embodiments, the computing system 500 may not include the user interface device 516. In some embodiments, the different components of the computing system 500 may be physically separate and may be communicatively coupled via any suitable mechanism. For example, the data storage 504 may be part of a storage device that is separate from a server, which includes the processor 510, the memory 512, and the communication unit 514, that is communicatively coupled to the storage device. The embodiments described herein may include the use of a special-purpose or general-purpose computer including various computer hardware or software modules, as discussed in greater detail below.

Figure 13:
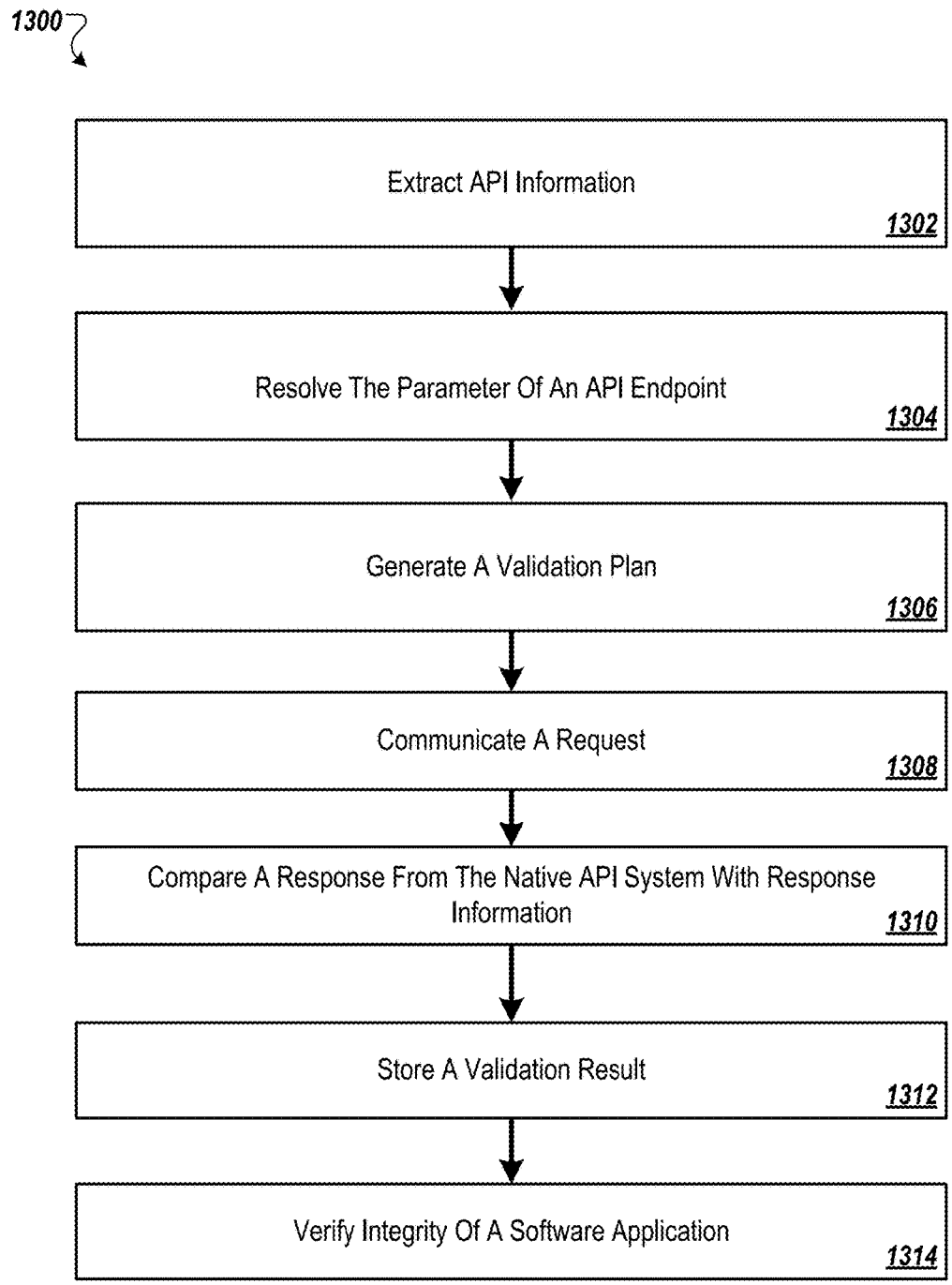
FIG. 13 is a flowchart of an example method of application programming interface (API) validation that may be implemented in the operating environment of FIG. 1.

FIG. 13 is a flowchart of an example method 1300 of application programming interface (API) validation, according to at least one embodiment of the present description. Although illustrated as discrete blocks, various blocks in FIG. 13 may be divided into additional blocks, combined into fewer blocks, or eliminated, depending on the desired implementation.

The method 1300 may begin at block 1302 in which API information may be extracted. The API information may be extracted from an API repository. The API information may include a parameter placeholder, parameter information related to a parameter of an API endpoint, an endpoint of the API, an endpoint description, a description of the API, a description of the parameter, response information, authentication requirement information, an API name, or some combination thereof. At block 1304, the parameter of the API endpoint may be resolved.

At block 1306, a validation plan may be generated. The validation plan includes an aggregation of information to create a list of fully resolved parameters to be tested for each endpoint of the plurality of endpoints. At block 1308, a request may be communicated. The request may be communicated to a native API system using the sample parameter value for the parameter and the endpoint for the API. The request may include a cURL request, a similar request type, or a similar request protocol. The requests may be communicated using an API call process.

At block 1310, a response from the native API system may be compared with response information. The response may be compared with response information. Based on the comparison, the parameter of the API may be validated. For example, if the response conforms or substantially conforms with the response information, the parameter may be validated for the API. At block 1312, a validation result may be stored. The validation result may be stored in a validation repository. At block 1314, integrity of a software application may be verified. The integrity of a software application may be verified based on the validity of the API endpoint. The software application may include a software application that implements the API endpoint for use with a native software application on the native API system.

In some embodiments, the parameter is a first parameter of a plurality of parameters. The endpoint is a first endpoint of a plurality of endpoints. Additionally, in these and other embodiment, the method 1300 may be repeated to resolve each of the parameters of the plurality of parameters of each endpoint of the plurality of endpoints.

Figure 14:
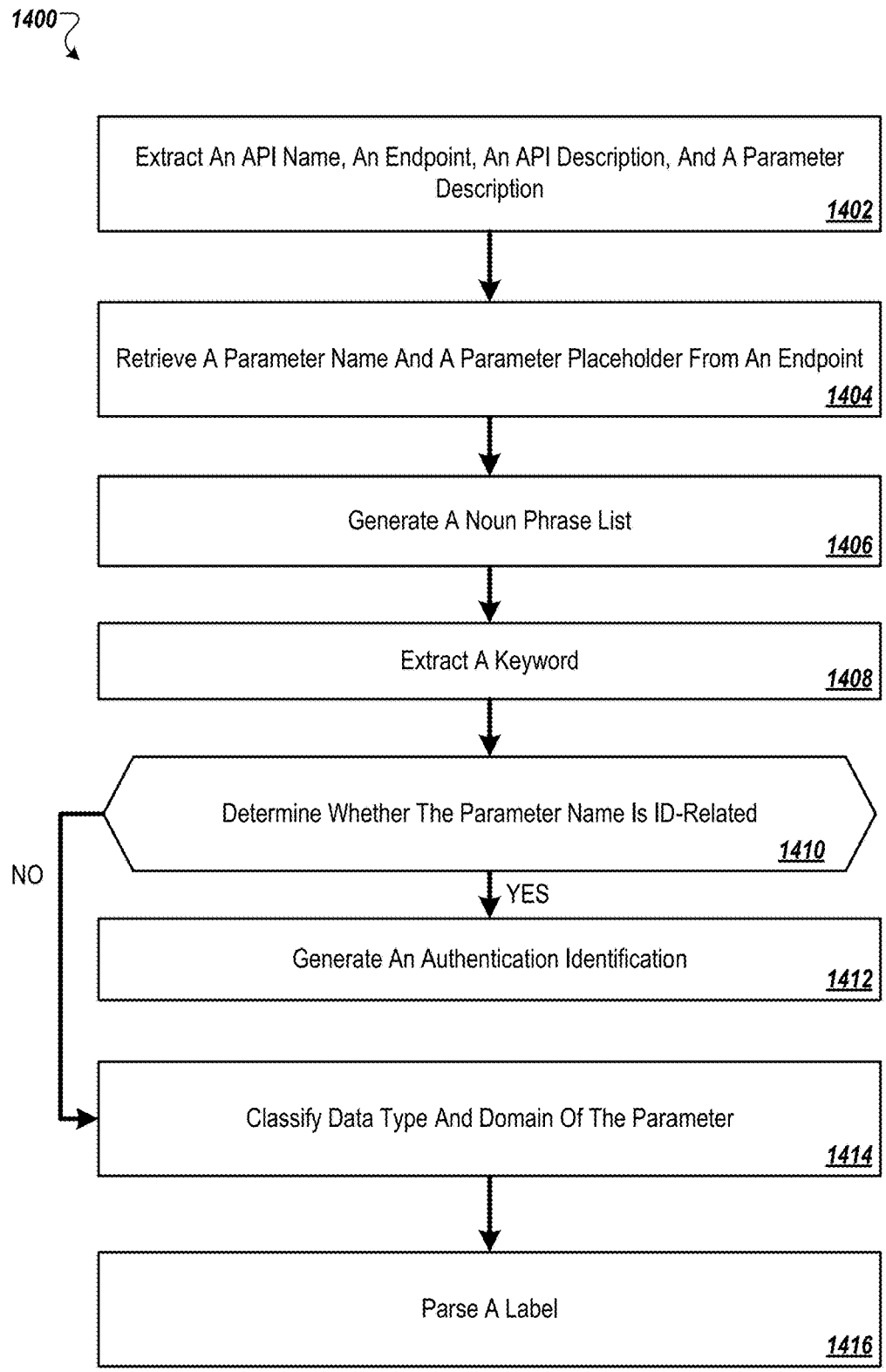
FIG. 14 is a flow chart of an example method of machine-generated parameter resolution that may be implemented in the operating environment of FIG. 1.

FIG. 14 is a flow chart of an example method 1400 of parameter resolution, according to at least one embodiment described in the present disclosure. Although illustrated as discrete blocks, various blocks in FIG. 1400 may be divided into additional blocks, combined into fewer blocks, or eliminated, depending on the desired implementation. In some embodiments, the method 1400 may be implemented in a step in another method. For example, the method 1400 may be implemented as block 1304 of the method 1300.

The method 1400 may begin at block 1402 in which an API name, an endpoint, an API description, a parameter name, a parameter description or another set of API information may be extracted. The API information may be extracted from an API repository. At block 1404, a parameter name and a parameter placeholder may be retrieved from the endpoint. At block 1406, a noun phrase list may be generated. The noun phrase list may be generated of noun phrases parsed from the endpoint description and the parameter based on a syntactic analysis.

At block 1408, a keyword may be extracted from the parameter name and the noun phrase list. At block 1410, it may be determined whether the parameter name is ID-related. In response to the parameter name being ID-related ("YES" at block 1410), the method 1400 may proceed to block 1412. In response to the parameter name not being ID-related ("NO" at block 1410), the method 1400 may proceed to block 1414.

At block 1412, an authentication identification may be generated. The authentication information may include a sample parameter value for a parameter that is ID-related. The authentication identification may include user ID and non-user ID. At block 1414, data type and domain of the parameter may be classified. The data type and domain of the parameter may be classified based at least partially on a query of the keyword in a third-party data repository. At block 1416, a label may be parsed. The label may be parsed from a query result and the parameter to retrieve a sample parameter value for the parameter in the API.

Figure 15:
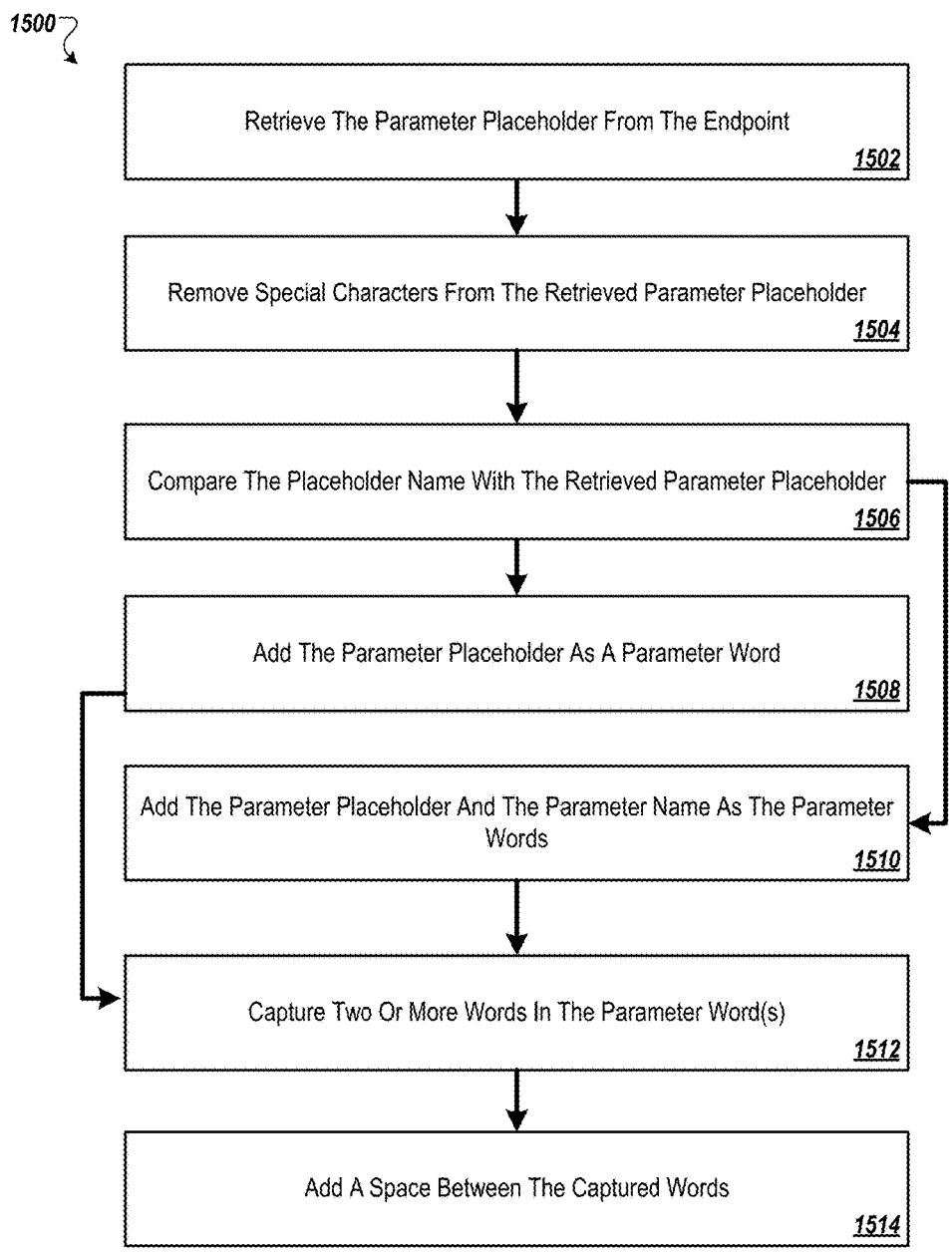
FIG. 15 is a flow chart of an example method of parameter name and parameter placeholder retrieval that may be implemented in the operating environment of FIG. 1.

FIG. 15 is a flow chart of an example method 1500 of parameter name and parameter placeholder retrieval, according to at least one embodiment described in the present disclosure. Although illustrated as discrete blocks, various blocks in FIG. 15 may be divided into additional blocks, combined into fewer blocks, or eliminated, depending on the desired implementation. In some embodiments, the method 1500 may be implemented in a step in another method. For example, the method 1500 may be implemented as block 1404 of the method 1400.

The method 1500 may begin at block 1502 in which the parameter placeholder may be retrieved from the endpoint. At block 1504, special characters may be removed from the retrieved parameter placeholder. At block 1506, the parameter name may be compared with the retrieved parameter placeholder. In response to the placeholder name being the same as the retrieved parameter placeholder, the method 1500 may proceed to block 1508. In response to the placeholder name not being the same as the retrieved parameter placeholder, the method 1500 may proceed to block 1510.

At block 1508, the parameter name may be added as a parameter word. At block 1510, the parameter placeholder and the parameter name may be added as the parameter words. At block 1512, two or more words in the parameter word(s) may be captured. The words in the parameter word(s) may be captured using an API language model. At block 1514, a space between the captured words may be added.

Figure 16:
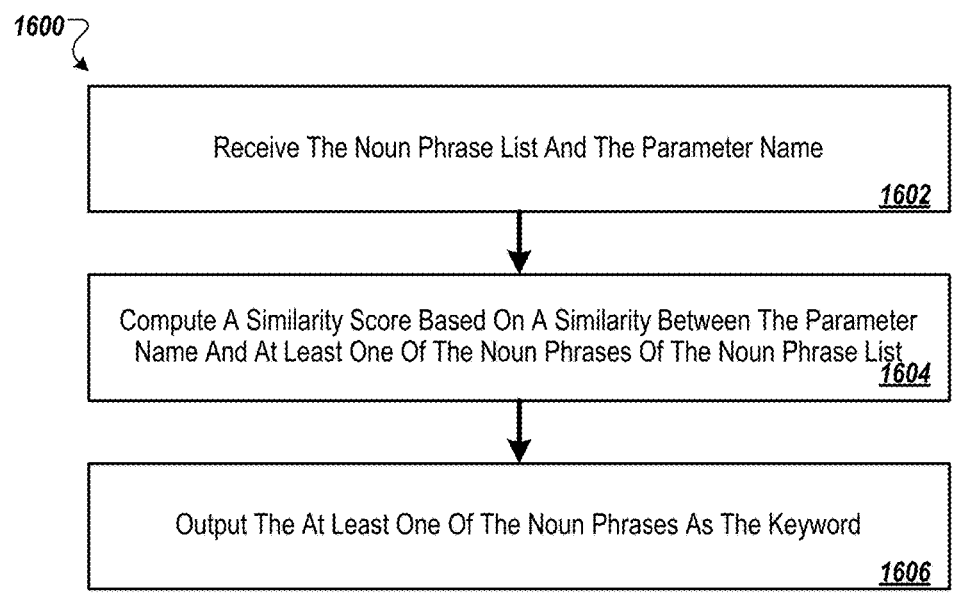
FIG. 16 is a flow chart of an example method of keyword extraction that may be implemented in the operating environment of FIG. 1.

FIG. 16 is a flow chart of an example method 1600 of keyword extraction, according to at least one embodiment described in the present disclosure. Although illustrated as discrete blocks, various blocks in FIG. 16 may be divided into additional blocks, combined into fewer blocks, or eliminated, depending on the desired implementation. In some embodiments, the method 1600 may be implemented in a step in another method. For example, the method 1600 may be implemented as block 1408 of the method 1400.

The method 1600 may begin at block 1602 in which the noun phrase list and the parameter name may be received. At block 1604, a similarity score may be computed. The similarity score may be based on a similarity between the parameter name and at least one of the noun phrases of the noun phrase list. At block 1606, the at least one of the noun phrases may be output as the keyword. The noun phrases may be output in response to the similarity score being greater than a particular threshold.

Figure 17:
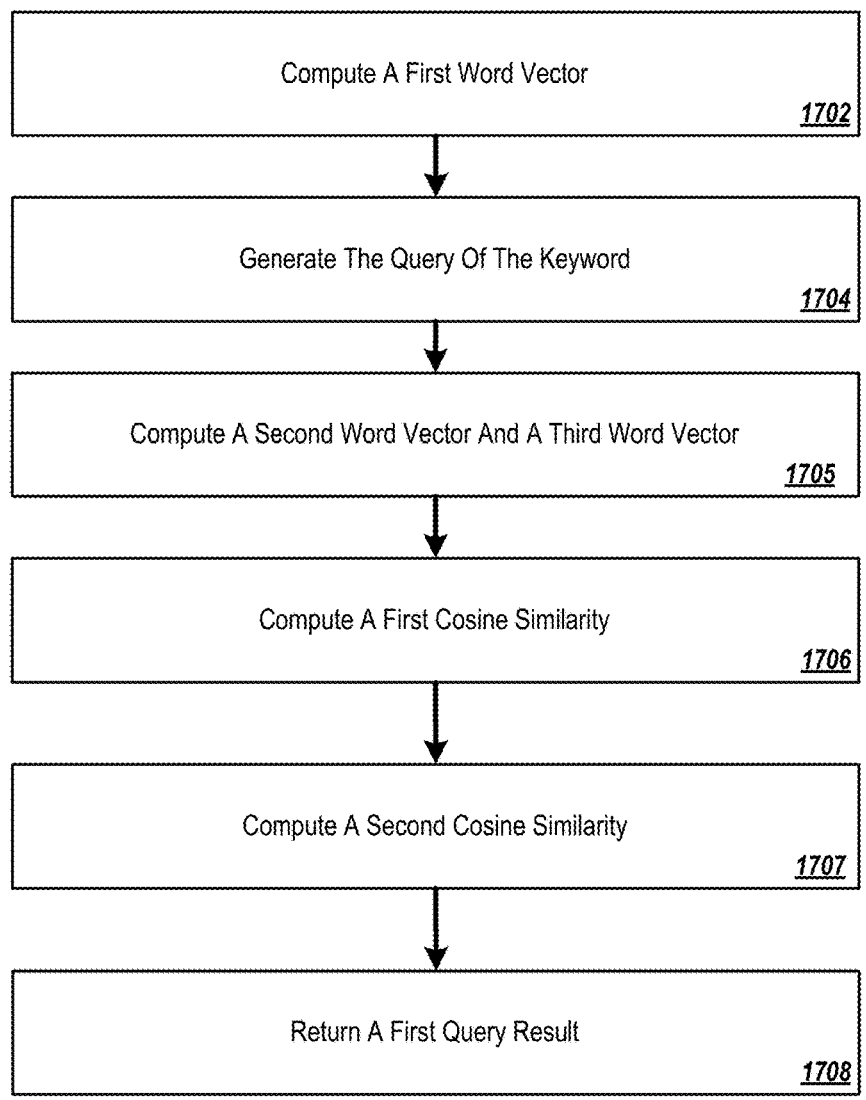
FIG. 17 is a flow chart of an example method of data type and domain classification that may be implemented in the operating environment of FIG. 1.

FIG. 17 is a flow chart of an example method 1700 of data type and domain classification, according to at least one embodiment described in the present disclosure. Although illustrated as discrete blocks, various blocks in FIG. 17 may be divided into additional blocks, combined into fewer blocks, or eliminated, depending on the desired implementation. In some embodiments, the method 1700 may be implemented in a step in another method. For example, the method 1700 may be implemented as block 1414 of the method 1400.

The method 1700 may begin at block 1702 in which a first word vector may be computed. The first word vectors may be computed for the extracted keyword and the noun phrases of a noun phrase list. At block 1704, the query of the keyword may be generated. The query may be generated in the third-party data repository. The keyword may be a keyword extracted in another method such as the method 1600 described above.

At block 1705, a second word vector and a third word vector may be computed. The second word vector may be for the classes and categories of a first query result. The third word vector may be for the classes and categories of a second query result.

At block 1706, a first cosine similarity may be computed. The first cosine similarity may be calculated between the first word vector and the second word vector. At block 1707, a second cosine similarity may be computed. The second cosine similarity may be calculated between the first word vector and the third word vector. At block 1708, the first query result may be returned. The first query result may be returned in response to the first cosine similarity being greater than the second cosine similarity.

Figure 18A:
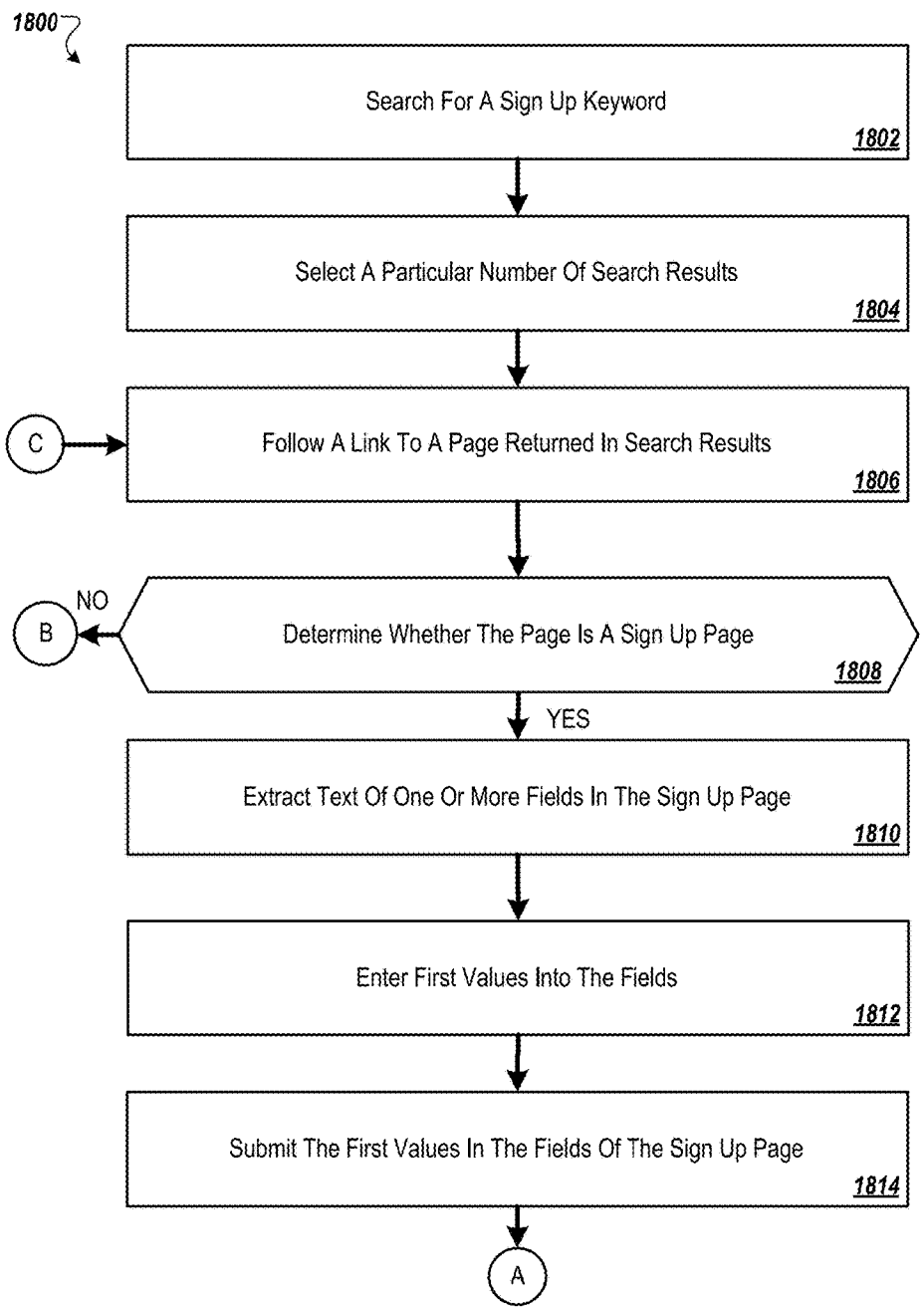
FIGS. 18A and 18B are a flow chart of an example method of user identifier (ID) extraction that may be implemented in the operating environment of FIG. 1.
Figure 18B:
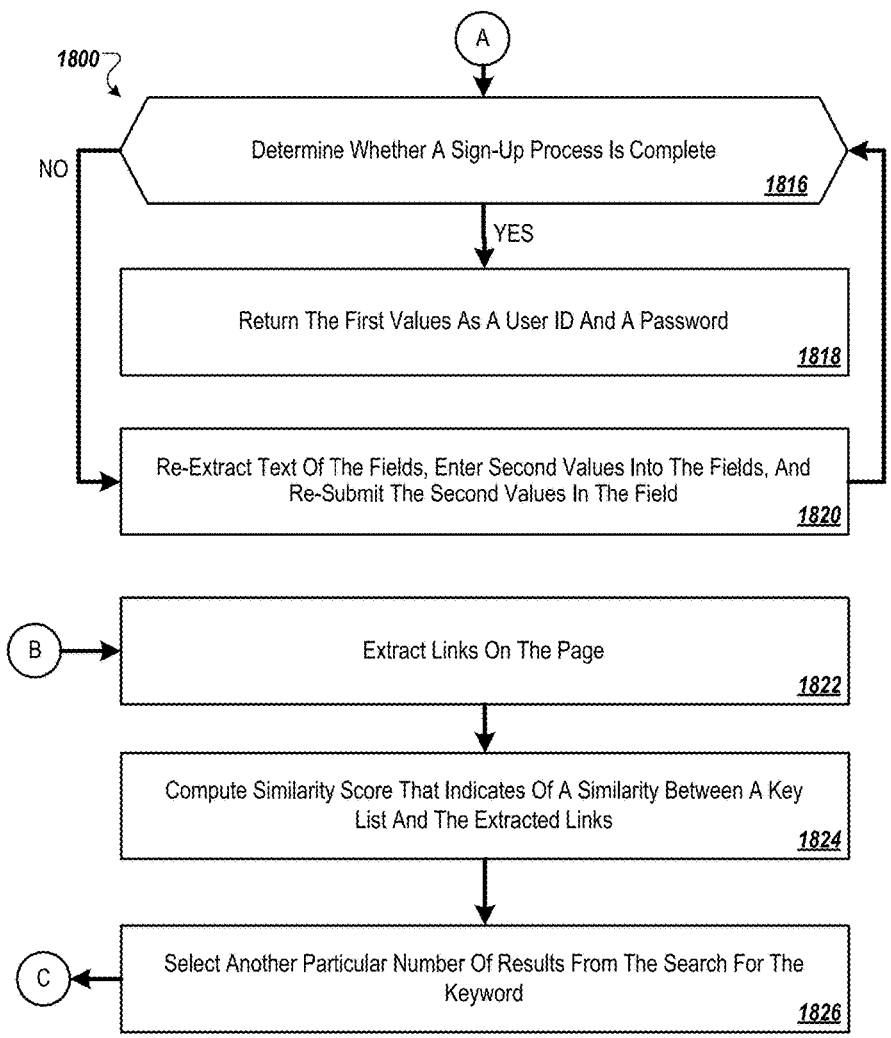

FIGS. 18A and 18B are a flow chart of an example method 1800 of user ID extraction, according to at least one embodiment described in the present disclosure. Although illustrated as discrete blocks, various blocks in FIGS. 18A and 18B may be divided into additional blocks, combined into fewer blocks, or eliminated, depending on the desired implementation. In some embodiments, the method 1800 may be implemented in a step in another method. For example, the method 1800 may be implemented as block 1412 of the method 1400 or block 1906 of method 1900. In embodiments in which the method 1800 is implemented as block 1412 of the method 1400, the method 1800 may be performed in response to a determination that a parameter name is user ID-related or a user ID-related word.

The method 1800 may begin at block 1802, in which a sign up keyword may be searched. The sign up keyword may be searched with the API name in a public search repository. The sign up keyword may include "sign up." At block 1804, a particular number of search results may be selected. For example, the particular number of search results may include three or another suitable number of search results. In some embodiments, block 1804 may be omitted. For instance, the search for the sign up keyword may include a single result. Thus, block 1804 may be omitted.

At block 1806, a link to a page returned in search results may be followed. At block 1808, it may be determined whether the page is a sign up page. The determination of whether the page is a sign up page may be based on a sign up page language model. In response to the page being a sign up page ("YES" at block 1808), the method 1800 may proceed to block 1810. In response to the page not being a sign up page ("NO" at block 1808), the method 1800 may proceed to block 1822.

At block 1810, text of one or more fields in the sign up page may be extracted. At block 1812, one or more first values may be entered into the fields. At block 1814, the first value(s) in the field of the sign up page may be submitted.

With reference to FIG. 18B, it may be determined whether a sign-up process is complete. The determination of whether the sign-up process is complete may be based on the sign up page language model. In response to the sign-up process being complete ("YES" at block 1816), the method 1800 may proceed to block 1818. In response to the sign-up process not being complete ("NO" at block 1816), the method 1800 may proceed to block 1820. At block 1818, the first values may be returned as a user ID and a password. At block 1820, the text of the fields may be re-extracted, second values may be entered into the fields, and the second values in the field may be submitted. From block 1820, the method 1800 may proceed to one or more of blocks 1816, 1818, and 1820.

At block 1822, links on the page may be extracted. At block 1824, a similarity score may be computed. The similarity score may indicate a similarity between a key list and the extracted links. In some embodiments, the key list may include sign up, sign in, account, registration, or another suitable key. At block 1826, another particular number of results from the search for the keyword may be selected. The particular number of results may be selected in response to the similarity score being greater than a particular threshold. The method 1800 may proceed from block 1826 to block 1806. From block 1806, the method 1800 may proceed through one or more of blocks 1808, 1810, 1812, 1814, 1816, 1818, 1820, 1822, 1824, 1826, or some combination thereof.

Figure 19:
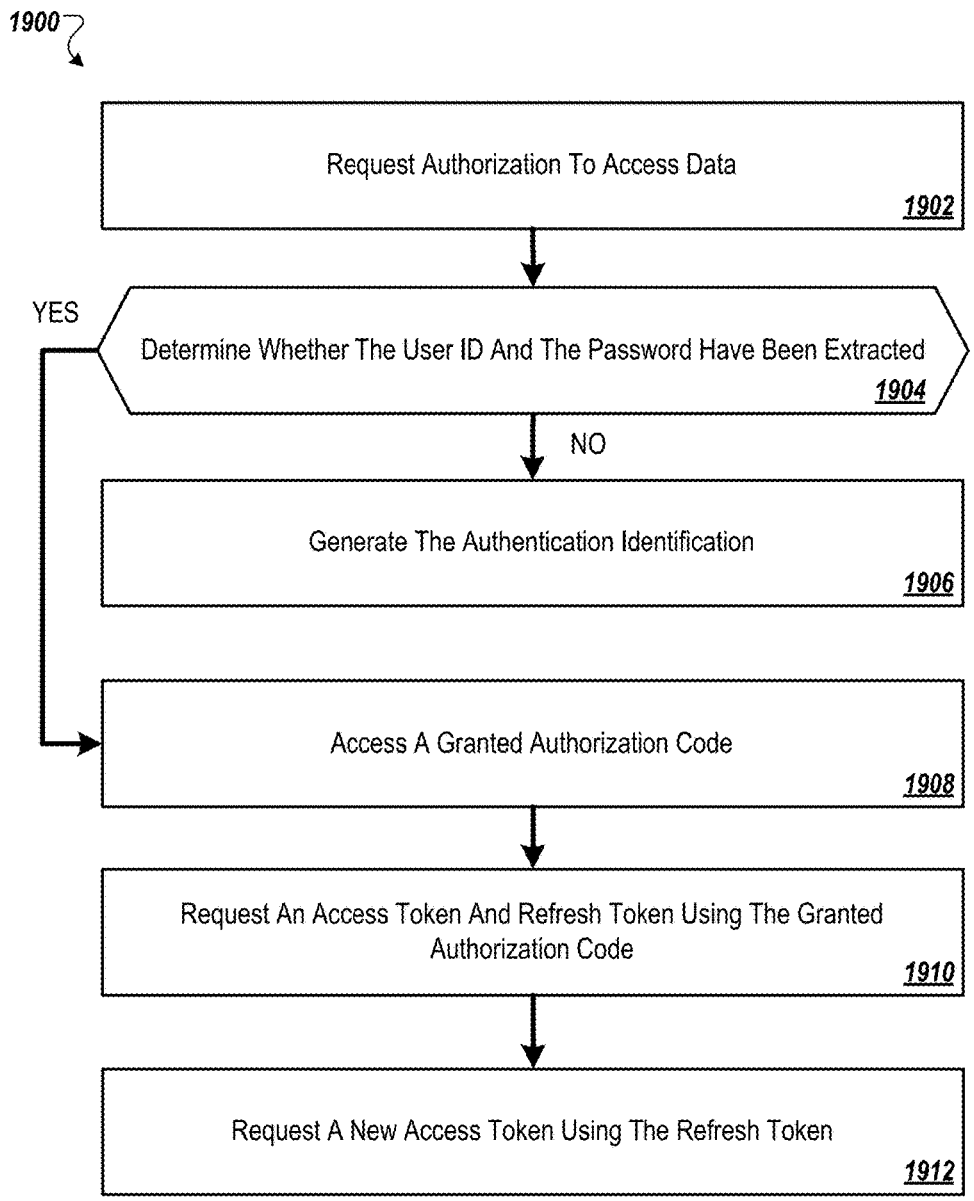
FIG. 19 is a flow chart of an example method for requesting access tokens that may be implemented in the operating environment of FIG. 1.

FIG. 19 is a flow chart of an example method 1900 for requesting access tokens, according to at least one embodiment described in the present disclosure. Although illustrated as discrete blocks, various blocks in FIG. 19 may be divided into additional blocks, combined into fewer blocks, or eliminated, depending on the desired implementation. The method 1900 may be implemented with one or more other methods described in the present disclosure. For instance, the method 1900 may be performed with the method 1800 described above.

The method 1900 may begin at block 1902 in which authorization to access data may be requested. At block 1904, it may be determined whether the user ID and the password have been extracted. It may be determined at a log-in prompt page. In response to the user ID and password not being extracted ("NO" at block 1904), the method 1900 may proceed to block 1906. In response to the user ID and password being extracted ("YES" at block 1904), the method 1900 may proceed to block 1908.

At block 1906, authentication identification may be generated. For example the authentication identification may be generated according to the method 1800 described above. At block 1908, a granted authorization code may be accessed. At block 1910, an access token and refresh token may be requested. The access token and the refresh token may be requested using the granted authorization code. At block 1912, a new access token may be requested. The new access token may be requested following a particular period of time after which the access token expires. The new access token may be requested using the refresh token.

Figure 20:
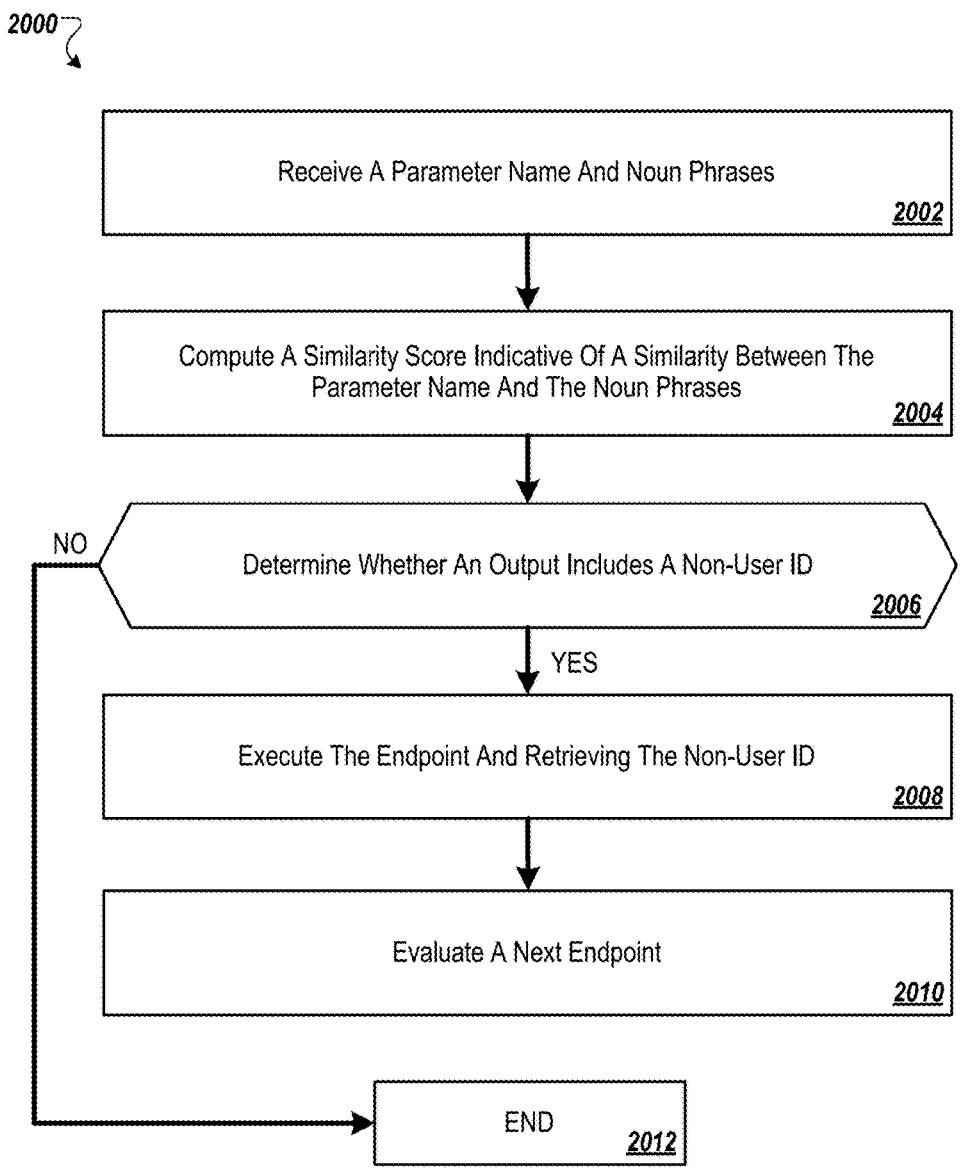
FIG. 20 is a flow chart of an example method 2000 of non-user ID extraction that may be implemented in the operating environment of FIG. 1, all according to at least one embodiment described in the present disclosure.

FIG. 20 is a flow chart of an example method 2000 of non-user ID extraction, according to at least one embodiment described in the present disclosure. Although illustrated as discrete blocks, various blocks in FIG. 20 may be divided into additional blocks, combined into fewer blocks, or eliminated, depending on the desired implementation. In some embodiments, the method 2000 may be implemented in a step in another method. For example, the method 2000 may be implemented as block 1412 of the method 1400. In embodiments in which the method 2000 is implemented as block 1412 of the method 1400, the method 2000 may be performed in response to a determination that a parameter name is a non-user ID-related or a non-user ID-related word.

The method 2000 may begin at block 2002, in which a parameter name and noun phrases of a noun phrase list may be received. At block 2004, a similarity score may be computed. The similarity score may be indicative of a similarity between the parameter name and the noun phrases. At block 2006, it may be determined whether an output includes a non-user ID. In response to the similarity score being greater than a particular threshold ("YES" at block 2006), the method 2000 may proceed to block 2008. In response to the similarity score not being greater than a particular threshold ("NO" at block 2006), the method 2000 may proceed to block 2012, in which the method 2000 may end. At block 2008, an endpoint may be executed and the non-user ID may be retrieved. At block 2010, a next endpoint may be evaluated according to one or more of blocks 2002, 2004, 2006, 2008, 2010, and 2012.

The methods 1300, 1400, 1500, 1600, 1700, 1800, 1900, and 2000 may be performed in an operating environment such as the operating environment 100 of FIG. 1. The methods 1300, 1400, 1500, 1600, 1700, 1800, 1900, and 2000 may be programmably performed in some embodiments by the API validation system 110 described with reference to FIG. 1. In some embodiments, the API validation system 110 or another computing system may include or may be communicatively coupled to a non-transitory computer-readable medium (e.g., the memory 512 of FIG. 5) having stored thereon programming code or instructions that are executable by one or more processors (such as the processor 510 of FIG. 5) to cause a computing system and/or the API validation system 110 to perform or control performance of the methods 1300, 1400, 1500, 1600, 1700, 1800, 1900, and 2000. Additionally or alternatively, the API validation system 110 may include the processor 510 described elsewhere in this disclosure that is configured to execute computer instructions to cause the API validation system 110 or another computing system to perform or control performance of the methods 1300, 1400, 1500, 1600, 1700, 1800, 1900, and 2000.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method for automated application programming interface (API) validation, the method comprising:
   extracting API information from an API repository, the API information including a parameter placeholder, parameter information related to a parameter of an API endpoint, an endpoint of the API, an endpoint description, a description of the API, a description of the parameter, response information, an authentication requirement information, and an API name;
   resolving the parameter of the API endpoint, wherein resolution of the parameter includes:
      extracting the API name, the endpoint, the API description, and the parameter description;
      retrieving a parameter name and a parameter placeholder from the endpoint;
      generating a noun phrase list of noun phrases parsed from the endpoint description and the parameter description based on a syntactic analysis;
      extracting a keyword from the parameter name and the noun phrase list;
      classifying data type and domain of the parameter based at least partially on a query of the keyword in a third-party data repository; and
      parsing a label from a query result as a sample parameter value for the parameter in the API;
   communicating, to a native API system, a request using the sample parameter value for the parameter for the API;
   comparing a response from the native API system with the response information to determine a validity of the API endpoint; and
   based on the validity of the API endpoint, verifying integrity of a software application implementing the API endpoint for use with a native software application on the native API system.

2. The method of claim 1, wherein the parameter is a first parameter of a plurality of parameters, and the endpoint is a first endpoint of a plurality of endpoints,
   the method further comprises:
      resolving each parameter of the plurality of parameters of each endpoint of the plurality of endpoints; and
      generating a validation plan that includes an aggregation of information to create a list of fully resolved parameters to be tested for each endpoint of the plurality of endpoints.

3. The method of claim 1, wherein retrieving the parameter name and the parameter placeholder includes:
   retrieving the parameter placeholder from the endpoint;
   removing special characters from the retrieved parameter placeholder;
   comparing the placeholder name with the retrieved parameter placeholder;
   in response to the placeholder name being the same as the retrieved parameter placeholder:
      adding the parameter name as a parameter word; and
      using an API language model, capturing two or more words in the parameter word and adding a space between the two or more captured words;
   in response to the placeholder name being different from the retrieved parameter placeholder:
      adding the parameter name and the retrieved parameter placeholder as parameter words; and using the API language model, capturing two or more words in each of the parameter words and adding a space between the captured words.

4. The method of claim 1, wherein the extracting the keyword includes:
receiving the noun phrase list and the parameter name;
computing a similarity score based on a similarity between the parameter name and at least one of the noun phrases of the noun phrase list; and
in response to the similarity score being greater than a particular threshold, outputting the at least one of the noun phrases as the keyword.

5. The method of claim 1, wherein classifying the data type and domain includes:
computing a first word vector for the extracted keyword and the noun phrases of the noun phrase list;
generating the query of the keyword in the third-party data repository;
computing a second word vector for classes and categories of a first query result and a third word vector for classes and categories of a second query result;
computing a first cosine similarity between the first word vector and the second word vector;
computing a second cosine similarity between the first word vector and the third word vector; and
returning the first query result in response to the first cosine similarity being greater than the second cosine similarity.

6. The method of claim 1, further comprising:
determining whether the parameter name is ID-related;
in response to the parameter name being ID-related, determining whether the parameter name is user ID-related or non-user ID-related;
in response to the parameter name being user ID-related, generating a user ID authentication identification, the generating the authentication identification including:
searching for a sign up keyword with the API name in a public search repository;
selecting a particular number of search results;
following a link to a page returned in search results;
determining, based on a sign up page language model, whether the page is a sign up page;
in response to the page being a sign up page, performing an automated sign in process; and
in response to the page not being a sign up page:
extracting links on the page;
computing a similarity score that indicates a similarity between a key list and the extracted links; and
in response to the similarity score being greater than a particular threshold, selecting another particular number of results from the search for the keyword.

7. The method of claim 6, wherein the automated sign in process includes:
extracting text of one or more fields in the sign up page;
entering first values into the fields;
submitting the first values in the field of the sign up page;
determining whether a sign-up process is complete based on the sign up page language model;
in response to the sign-up process being complete, returning the first values as a user ID and a password; and
in response to the sign-up process being incomplete, re-extracting text of the fields, entering second values into the fields, and submitting the second values in the field.

8. The method of claim 6, further comprising:
requesting authorization to access data automatically;
at a log-in prompt page, determining whether a user ID and a password have been extracted;
in response to the user ID and the password not being extracted, generating the user ID authentication identification;
in response to the user ID and the password being extracted:
accessing a granted authorization code;
requesting an access token and refresh token using the granted authorization code; and
following a particular period of time after which the access token expires, requesting a new access token using the refresh token.

9. The method of claim 6, wherein in response to the parameter name being non-user ID-related, generating a non-user ID authentication identification, the generating the non-user ID authentication identification including:
receiving the parameter name and the noun phrases of the noun phrase list;
computing a similarity score indicative of a similarity between the parameter name and the noun phrases;
in response to the similarity score being greater than a particular threshold, determining whether an output includes a non-user ID; and
in response to the output including the non-user ID:
executing the endpoint and retrieving the non-user ID; and
in response to the output not including the non-user ID, evaluating another endpoint.

10. The method of claim 1, further comprising storing a validation result in a validation repository.

11. A non-transitory computer-readable medium having encoded therein programming code executable by one or more processors to perform or control performance of operations comprising: extracting API information from an API repository, the API information including a parameter placeholder, parameter information related to a parameter of an API endpoint, an endpoint of the API, an endpoint description, a description of the API, a description of the parameter, response information, an authentication requirement information, and an API name;
resolving the parameter of the API endpoint, wherein resolution of the parameter includes:
extracting the API name, the endpoint, the API description, and the parameter description;
retrieving a parameter name and a parameter placeholder from the endpoint;
generating a noun phrase list of noun phrases parsed from the endpoint description and the parameter description based on a syntactic analysis;
extracting a keyword from the parameter name and the noun phrase list;
classifying data type and domain of the parameter based at least partially on a query of the keyword in a third-party data repository; and
parsing a label from a query result as a sample parameter value for the parameter in the API;
communicating, to a native API system, a request using the sample parameter value for the parameter for the API;
comparing a response from the native API system with the response information to determine a validity of the API endpoint; and
based on the validity of the API endpoint, verifying integrity of a software application implementing the API endpoint for use with a native software application on the native API system.

12. The non-transitory computer-readable medium of claim 11, wherein:
the parameter is a first parameter of a plurality of parameters;
the endpoint is a first endpoint of a plurality of endpoints; and
the operations further comprise:
resolving each parameter of the plurality of parameters of each endpoint of the plurality of endpoints; and
generating a validation plan that includes an aggregation of information to create a list of fully resolved parameters to be tested for each endpoint of the plurality of endpoints.

13. The non-transitory computer-readable medium of claim 11, wherein the extracting the parameter name and the parameter placeholder includes:
retrieving the parameter placeholder from the endpoint;
removing special characters from the retrieved parameter placeholder;
comparing the placeholder name with the retrieved parameter placeholder;
in response to the placeholder name being the same as the retrieved parameter placeholder:
adding the parameter name as a parameter word; and
using an API language model, capturing two or more words in the parameter word and adding a space between the two or more captured words;
in response to the placeholder name being different from the retrieved parameter placeholder:
adding the parameter name and the retrieved parameter placeholder as parameter words; and
using the API language model, capturing two or more words in each of the parameter words and adding a space between the captured words.

14. The non-transitory computer-readable medium of claim 11, wherein the extracting the keyword includes:
receiving the noun phrase list and the parameter name;
computing a similarity score based on a similarity between the parameter name and at least one of the noun phrases of the noun phrase list; and
in response to the similarity score being greater than a particular threshold, outputting the at least one of the noun phrases as the keyword.

15. The non-transitory computer-readable medium of claim 11, wherein classifying the data type and domain includes:
computing a first word vector for the extracted keyword and the noun phrases of the noun phrase list;
generating the query of the keyword in the third-party data repository;
computing a second word vector for classes and categories of a first query result and a third word vector for classes and categories of a second query result;
computing a first cosine similarity between the first word vector and the second word vector;
computing a second cosine similarity between the first word vector and the third word vector; and
returning the first query result in response to the first cosine similarity being greater than the second cosine similarity.

16. The non-transitory computer-readable medium of claim 11, wherein the operations further comprise:
determining whether the parameter name is ID-related;
in response to the parameter name being ID-related, determining whether the parameter name is user ID-related or non-user ID-related;
in response to the parameter name being user ID-related, generating a user ID authentication identification, the generating the authentication identification including:
searching for a sign up keyword with the API name in a public search repository;
selecting a particular number of search results;
following a link to a page returned in search results;
determining, based on a sign up page language model, whether the page is a sign up page;
in response to the page being a sign up page, performing an automated sign in process; and
in response to the page not being a sign up page:
extracting links on the page;
computing a similarity score that indicates a similarity between a key list and the extracted links; and
in response to the similarity score being greater than a particular threshold, selecting another particular number of results from the search for the keyword.

17. The non-transitory computer-readable medium of claim 16, wherein the automated sign in process includes:
extracting text of one or more fields in the sign up page;
entering first values into the fields;
submitting the first values in the field of the sign up page;
determining whether a sign-up process is complete based on the sign up page language model;
in response to the sign-up process being complete, returning the first values as a user ID and a password; and
in response to the sign-up process being incomplete, re-extracting text of the fields, entering second values into the fields, and submitting the second values in the field.

18. The non-transitory computer-readable medium of claim 16, wherein the operations further comprise:
requesting authorization to access data;
at a log-in prompt page, determining whether a user ID and a password have been extracted;
in response to the user ID and the password not being extracted, generating the user ID authentication identification;
in response to the user ID and the password being extracted:
accessing a granted authorization code;
requesting an access token and refresh token using the granted authorization code; and
following a particular period of time after which the access token expires, requesting a new access token using the refresh token.

19. The non-transitory computer-readable medium of claim 16, wherein in response to the parameter name being non-user ID-related, generating a non-user ID authentication identification, the generating the non-user ID authentication identification including:
receiving the parameter name and the noun phrases of the noun phrase list;
computing a similarity score indicative of a similarity between the parameter name and the noun phrases;
in response to the similarity score being greater than a particular threshold, determining whether an output includes a non-user ID; and
in response to the output including the non-user ID:
executing the endpoint and retrieving the non-user ID; and
in response to the output not including the non-user ID, evaluating another endpoint.

20. The non-transitory computer-readable medium of claim 11, wherein the operations further comprise storing a validation result in a validation repository.

\* \* \* \* \*